United States Patent
Kim et al.

(10) Patent No.: US 12,231,940 B2
(45) Date of Patent: Feb. 18, 2025

(54) METHOD AND DEVICE FOR TRANSMITTING/RECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Kyuseok Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 357 days.

(21) Appl. No.: 17/800,757

(22) PCT Filed: Feb. 17, 2021

(86) PCT No.: PCT/KR2021/002032
§ 371 (c)(1),
(2) Date: Aug. 18, 2022

(87) PCT Pub. No.: WO2021/167348
PCT Pub. Date: Aug. 26, 2021

(65) Prior Publication Data
US 2023/0103697 A1    Apr. 6, 2023

(30) Foreign Application Priority Data
Feb. 19, 2020   (KR) .......... 10-2020-0020669

(51) Int. Cl.
*H04W 24/10*   (2009.01)
*H04B 17/345*  (2015.01)

(52) U.S. Cl.
CPC .......... *H04W 24/10* (2013.01); *H04B 17/345* (2015.01)

(58) Field of Classification Search
CPC .. H04B 17/309; H04B 17/336; H04B 17/345; H04B 17/346; H04B 17/347; H04B 17/354; H04W 24/10
See application file for complete search history.

(56) References Cited

U.S. PATENT DOCUMENTS

2019/0159215 A1   5/2019  Su et al.
2022/0385384 A1*  12/2022 Jiang .............. H04B 7/063
(Continued)

FOREIGN PATENT DOCUMENTS

WO   2018204590   11/2018
WO   2019100257    5/2019

OTHER PUBLICATIONS

Huawei et al., CSI measurement enhancement for multi-TRP/panel transmission, R1-1903100, 3GPP TSG RAN WG1 Meeting #96, Athens, Greece, Feb. 16, 2019, see sections 1-4; and figures 1 and 6.

(Continued)

*Primary Examiner* — Bo Hui A Zhu
(74) *Attorney, Agent, or Firm* — BRYAN CAVE LEIGHTON PAISNER LLP

(57) ABSTRACT

A method and a device for transmitting/receiving channel state information in a wireless communication system are disclosed. A method by which a terminal transmits channel state information (CSI) in a wireless communication system, according to one embodiment of the disclosure, can comprise the steps of: receiving, from a base station, CSI related configuration information including a first CSI report configuration and a second CSI report configuration; calculating a channel quality indicator (CQI) on the basis of the assumption that a first channel measurement resource (CMR) related to the first CSI report configuration is an IMR and that a first interference measurement resource (IMR) related (Continued)

to the first CSI report configuration is a CMR; and reporting, to the base station, first CSI including the first interference-based CQI.

17 Claims, 20 Drawing Sheets

(56) References Cited

U.S. PATENT DOCUMENTS

2023/0061722 A1\* 3/2023 Hao ................. H04B 7/048
2024/0097762 A1\* 3/2024 Kyung ............... H04B 7/024

OTHER PUBLICATIONS

Spreadtrum Communications, Discussion on Multi-TRP transmission, R1-1912562, 3GPP TSG RAN WG1 Meeting #99, Reno, USA, Nov. 8, 2019, see section 2.

\* cited by examiner

METHOD AND DEVICE FOR TRANSMITTING/RECEIVING CHANNEL STATE INFORMATION IN WIRELESS COMMUNICATION SYSTEM

This application is the National Stage filing under 35 U.S.C. 371 of International Application No. PCT/KR2021/002032 filed on Feb. 17, 2021, which claims priority to Korean Patent Application No. 10-2020-0020669 filed on Feb. 19, 2020, the contents of which are all hereby incorporated by reference herein in their entirety.

TECHNICAL FIELD

The present disclosure relates to a wireless communication system, and in more detail, relates to a method and an apparatus of transmitting and receiving channel state information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving channel state information.

An additional technical object of the present disclosure is to provide a method and an apparatus of transmitting and receiving channel state information in consideration of interference between multiple transmission reception point (TRPS).

The technical objects to be achieved by the present disclosure are not limited to the above-described technical objects, and other technical objects which are not described herein will be clearly understood by those skilled in the pertinent art from the following description.

Technical Solution

According to an aspect of the present disclosure, a method of transmitting channel state information (CSI) by a terminal in a wireless communication system may comprise, receiving, from a base station, CSI-related configuration information including a first CSI report configuration and a second CSI report configuration; calculating a first interference-based channel quality indicator (CQI), based on assuming a first channel measurement resource (CMR) related to the first CSI report configuration as an interference measurement resource (IMR) and assuming a first IMR related to the first CSI report configuration as a CMR; and transmitting, to the base station, first CSI including the first interference-based CQI.

According to an additional aspect of the present disclosure, a method of receiving channel state information (CSI) by a base station in a wireless communication system may comprise, transmitting, to a terminal, CSI-related configuration information including a first CSI report configuration and a second CSI report configuration; and receiving, from the terminal, first CSI including the first interference-based CQI, calculated based on assuming a first channel measurement resource (CMR) related to the first CSI report configuration as an interference measurement resource (IMR) and assuming a first IMR related to the first CSI report configuration as a CMR.

Advantageous Effects

According to the present disclosure, a method and an apparatus of transmitting and receiving channel state information may be provided.

According to the present disclosure, a method and an apparatus of transmitting and receiving channel state information in consideration of interference between multiple transmission reception point (TRPs) may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
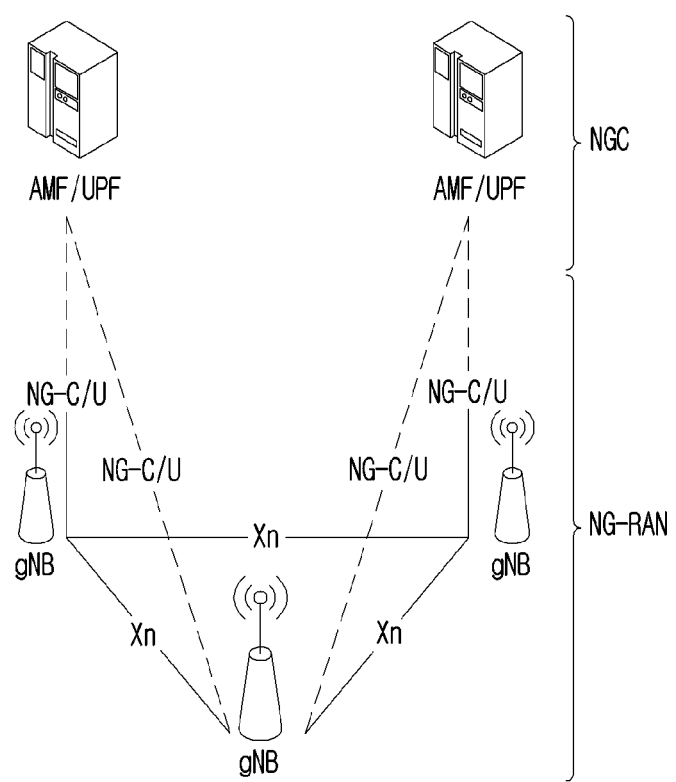
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block):Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
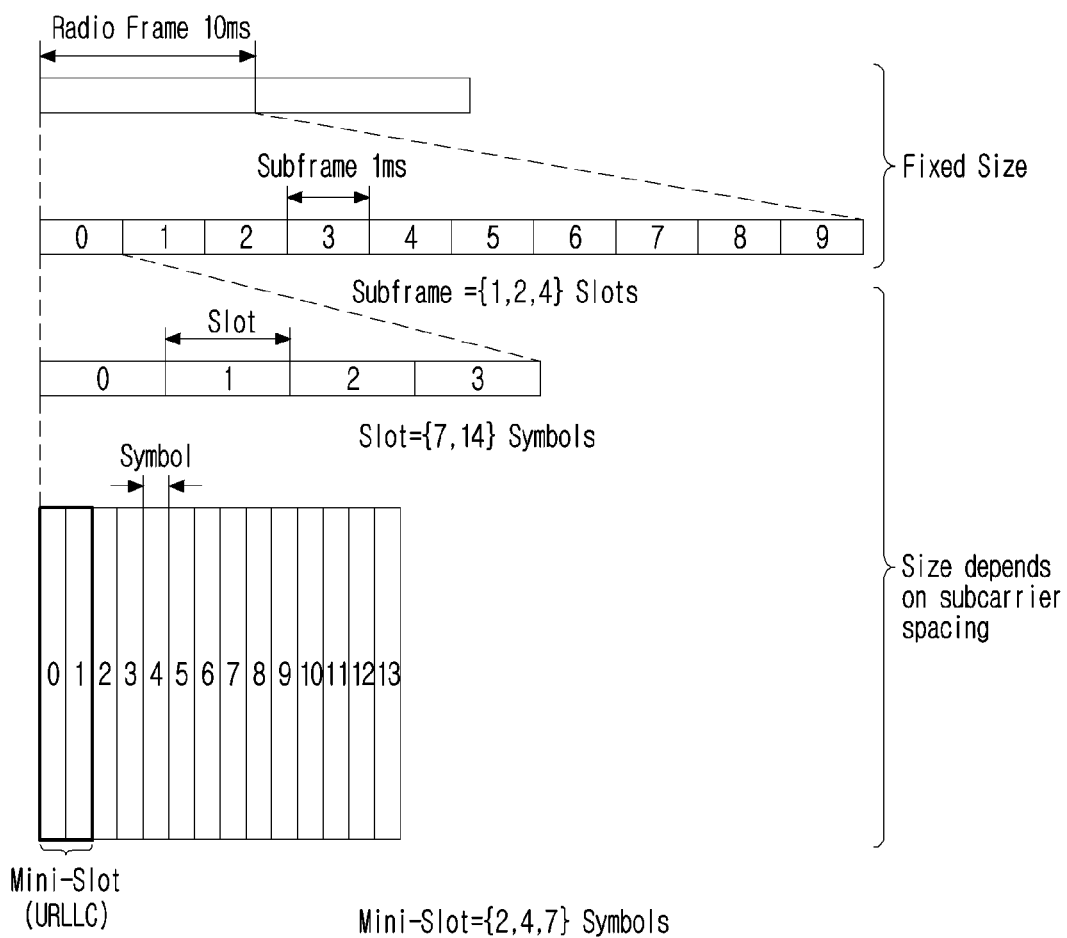
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^{µ} * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA}+N_{TA,offset})T_c$ than a corresponding downlink frame in a corresponding terminal starts. For a subcarrier spacing configuration µ, slots are numbered in an increasing order of $n_s^µ \in \{0, \ldots, N_{slot}^{subframe,µ}-1\}$ in a subframe and are numbered in an increasing order of $n_{s,f}^µ \in \{0, \ldots, N_{slot}^{frame,µ}-1\}$ in a radio frame. One slot is configured with $N_{symb}^{slot}$ consecutive OFDM symbols and $N_{symb}^{slot}$ is determined according to CP. A start of a slot $n_s^µ$ in a subframe is temporally arranged with a start of an OFDM symbol $n_s^µ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,µ}$) and the number of slots per subframe ($N_{slot}^{subframe,µ}$) in a normal CP and Table 4 represents the number of OFDM symbols per slot, the number of slots per radio frame and the number of slots per subframe in an extended CP.

TABLE 3

| µ | $N_{symb}^{slot}$ | $N_{slot}^{frame,µ}$ | $N_{slot}^{subframe,µ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,µ}$ | $N_{slot}^{subframe,µ}$ |
|---|---|---|---|
| 2 | 12 | 40 | 4 |

FIG. 2 is an example on µ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
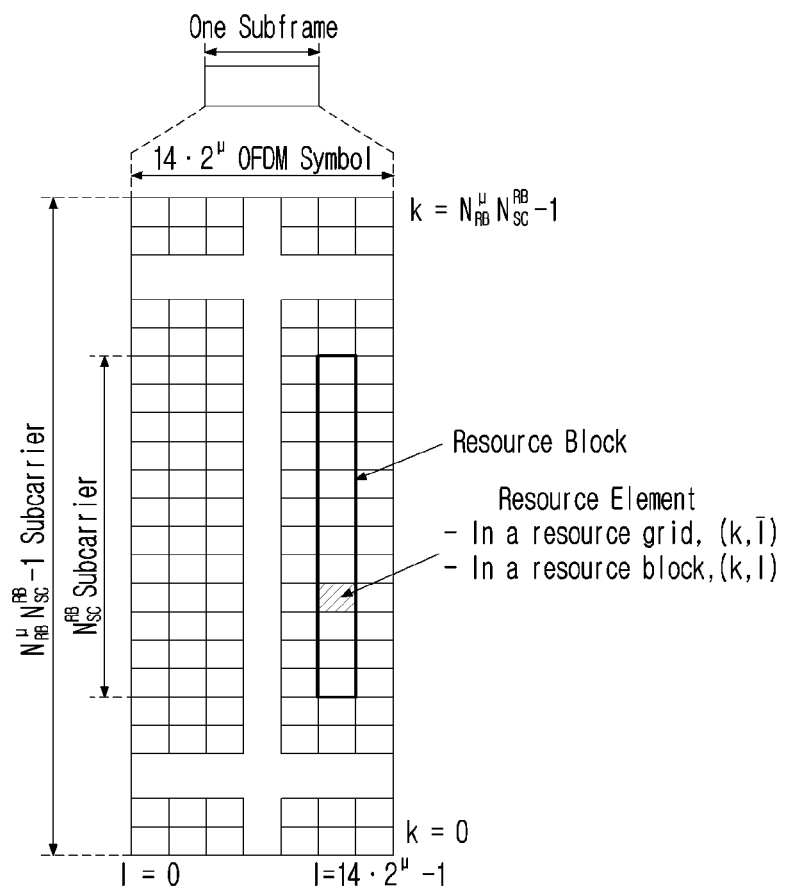
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^µ N_{SC}^{RB}$ subcarriers in a frequency domain and one subframe is configured with $14 \cdot 2^µ$ OFDM symbols, but it is not limited thereto. In an NR system, a transmitted signal is described by OFDM symbols of $2^µ N_{symb}^{(µ)}$ and one or more resource grids configured with $N_{RB}^µ N_{SC}^{RB}$ subcarriers. Here, $N_{RB}^µ \leq N_{RB}^{max,µ}$. The $N_{RB}^{max,µ}$ represents a maximum transmission bandwidth, which may be different between an uplink and a downlink as well as between numerologies. In this case, one resource grid may be configured per µ and antenna port p. Each element of a resource grid for µ and an antenna port p is referred to as a resource element and is uniquely identified by an index pair (k, l'). Here, $k=0, \ldots, N_{RB}^µ N_{SC}^{RB}-1$ is an index in a frequency domain and $l'=0, \ldots, 2^µ N_{symb}^{(µ)}-1$ refers to a position of a symbol in a subframe. When referring to a resource element in a slot, an index pair (k, l) is used. Here, $l=0, \ldots, N_{symb}^µ-1$. A resource element (k, l') for µ and an antenna port p corresponds to a complex value, $a_{k,l'}^{(p,µ)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{SC}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

Equation 2

$$n_{CRB}^\mu = n_{PRB}^\mu + N_{BWP,i}^{start,\mu}$$

$N_{BWP,i}^{start,\mu}$ is a common resource block that a BWP starts relatively to common resource block 0.

Figure 4:
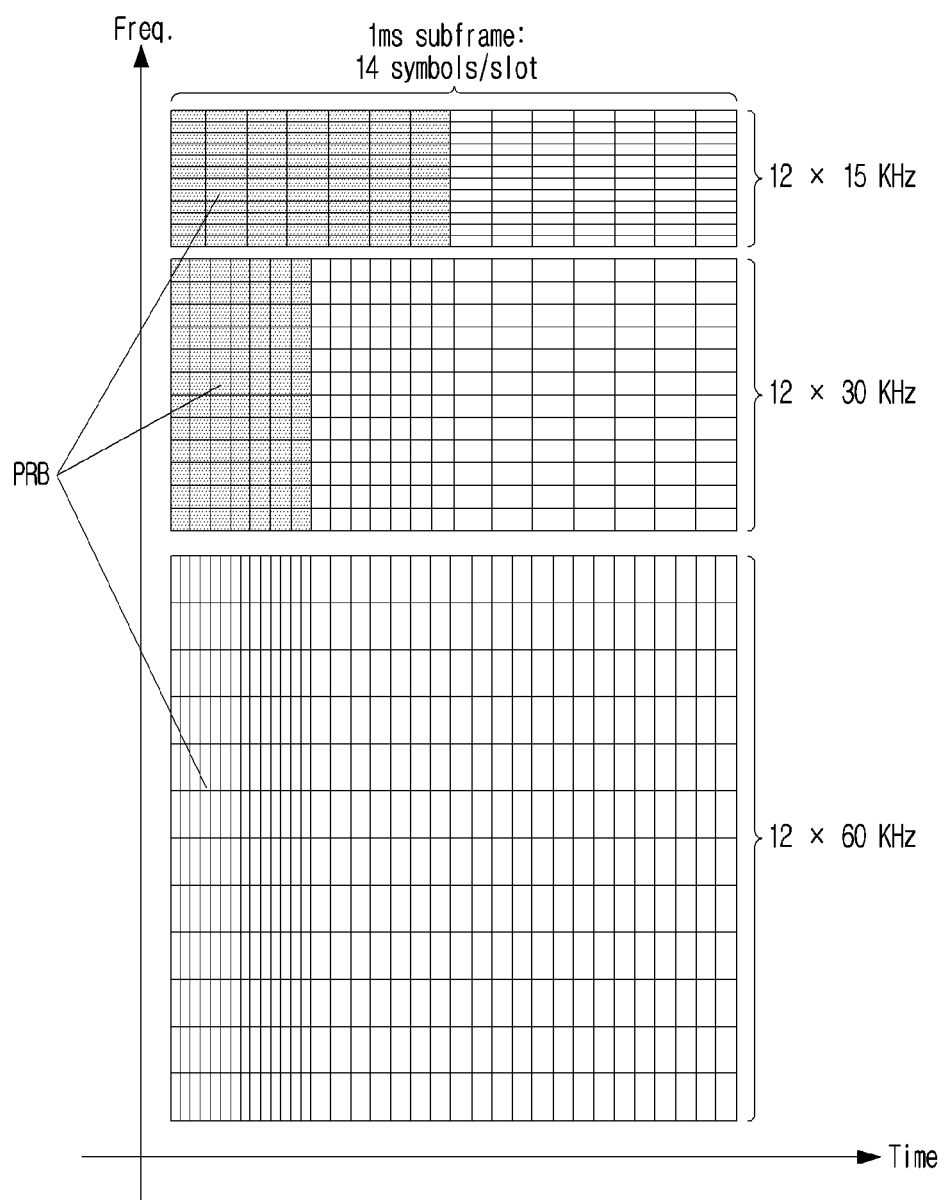
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
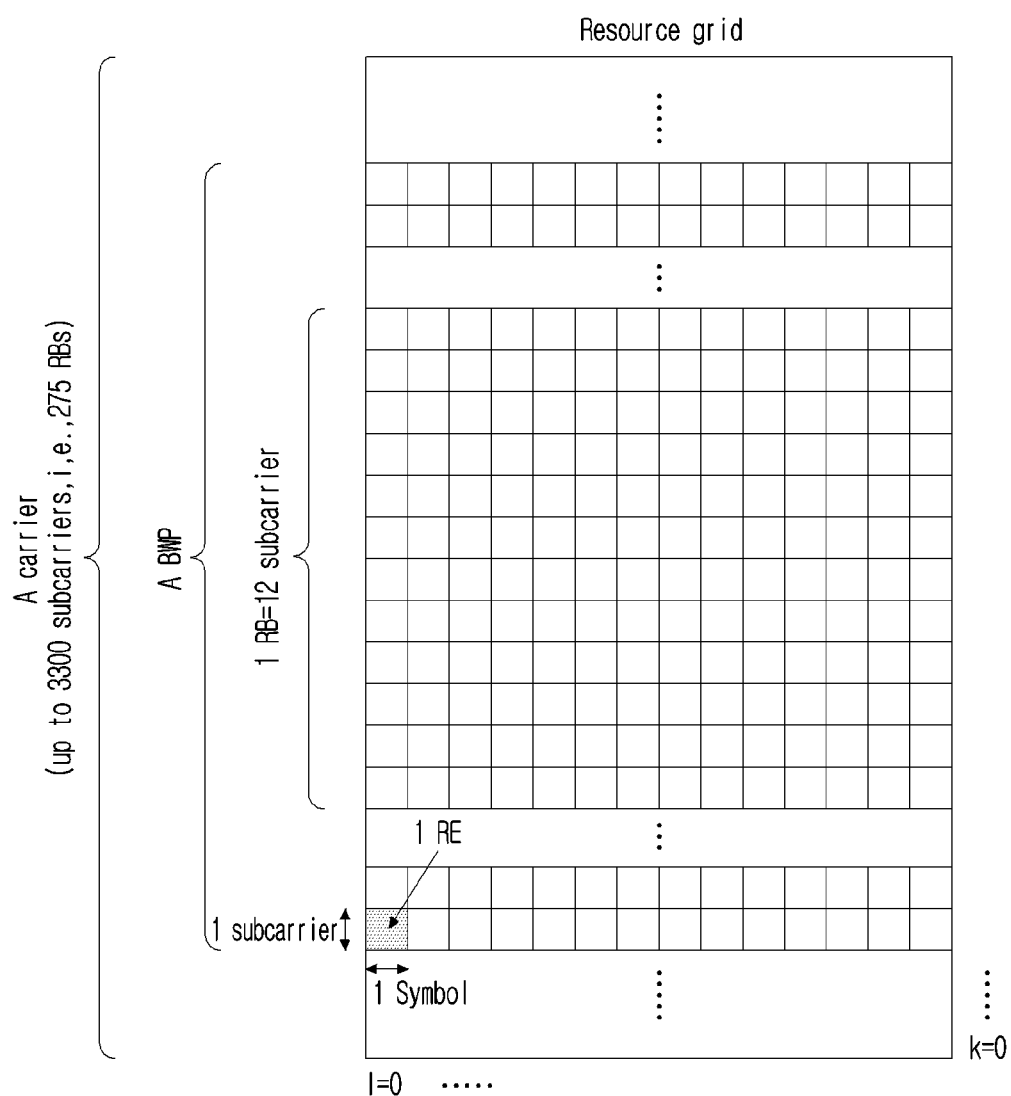
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
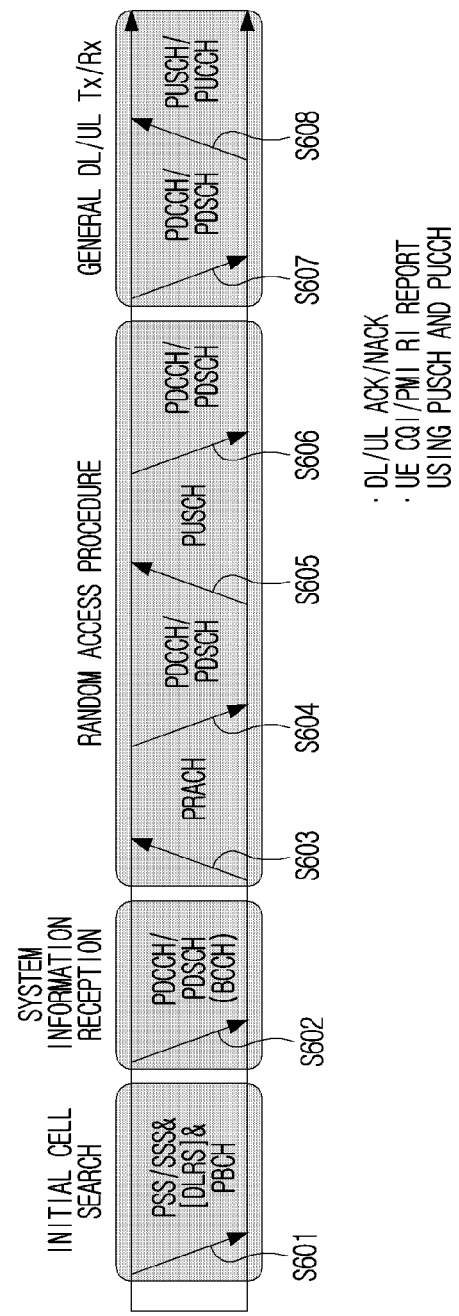
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

As a BM procedure is L1 (layer 1)/L2 (layer 2) procedures for acquiring and maintaining a set of base station (e.g., gNB, TRP, etc.) and/or terminal (e.g., UE) beams which may be used to transmit/receive a downlink (DL) and an uplink (UL), it may include the following procedures and terms.

Beam measurement: An operation that a base station or UE measures a property of a received beamforming signal Beam determination: An operation that a base station or UE selects its Tx beam/Rx beam Beam sweeping: An operation of covering a spatial domain by using a Tx and/or Rx beam during a certain time interval in a predetermined manner Beam report: An operation that UE reports information of a beamformed signal based on beam measurement In addition, each BM procedure may include Tx beam sweeping for determining a Tx Beam and Rx beam sweeping for determining a Rx beam.

A BM procedure may be divided into (1) a DL BM procedure using a synchronization signal (SS)/physical broadcast channel (PBCH) Block or CSI-RS, and (2) a UL BM procedure using a sounding reference signal (SRS).

Hereinafter, a DL BM procedure is described.

A DL BM procedure may include (1) transmission for beamformed DL RSs (reference signal) of a base station (e.g., a CSI-RS or a SS Block (SSB)) and (2) beam reporting of a terminal.

Here, beam reporting may include preferred DL RS ID (identifier)(s) and L1-RSRP (Reference Signal Received Power) corresponding to it.

The DL RS ID may be a SSBRI (SSB Resource Indicator) or a CRI (CSI-RS Resource Indicator).

Hereinafter, a DL BM procedure using a SSB is described.

Figure 7:
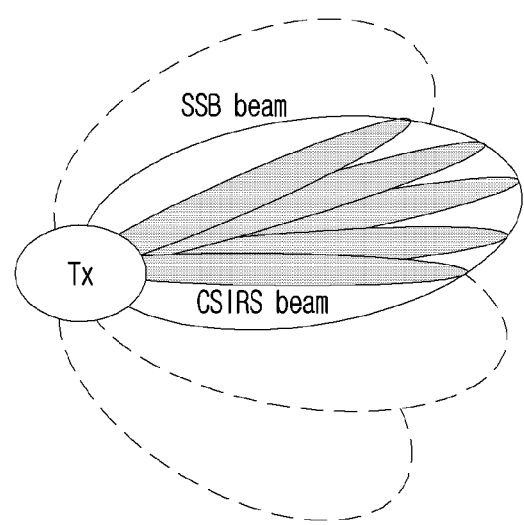
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, a SSB beam and a CSI-RS beam may be used for beam measurement. A measurement metric is L1-RSRP per resource/block. A SSB may be used for coarse beam measurement and a CSI-RS may be used for fine beam measurement. A SSB may be used for both Tx beam sweeping and Rx beam sweeping.

Rx beam sweeping using a SSB may be performed while UE changes a Rx beam for the same SSBRI across multiple SSB bursts. Here, one SS burst includes one or more SSBs and one SS burst set includes one or more SSB bursts.

Figure 8:
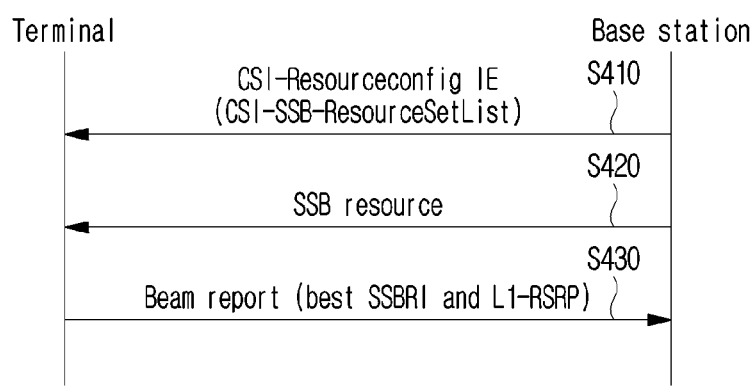
FIG. 8 is a diagram which illustrates a downlink beam management procedure using a SSB in a wireless communication system to which the present disclosure may be applied.

FIG. 8 is a diagram which illustrates a downlink beam management procedure using a SSB in a wireless communication system to which the present disclosure may be applied.

A configuration on beam report using a SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station S410.

Table 6 represents an example of CSI-ResourceConfig IE and as in Table 6, a BM configuration using a SSB configures a SSB like a CSI-RS resource without being separately defined.

In Table 6, a csi-SSB-ResourceSetList parameter represents a list of SSB resources used for beam management and reporting in one resource set. Here, a SSB resource set may be configured as {SSBx1, SSBx2, SSBx3, SSBx4, . . . }. A SSB index may be defined as 0 to 63. A terminal receives a SSB resource from the base station based on the CSI-SSB-ResourceSetList S420.

When CSI-RS reportConfig related to report on SSBRI and L1-RSRP is configured, the terminal (beam) reports the best SSBRI and L1-RSRP corresponding to it to a base station S430.

Hereinafter, a DL BM procedure using a CSI-RS is described.

When usage of a CSI-RS is described, a CSI-RS is used for beam management i) when a repetition parameter is configured for a specific CSI-RS resource set and TRS_info is not configured. ii) When a repetition parameter is not configured and TRS_info is configured, a CSI-RS is used for a TRS (tracking reference signal). iii) When a repetition parameter is not configured and TRS_info is not configured, a CSI-RS is used for CSI acquisition.

Such a repetition parameter may be configured only for CSI-RS resource sets connected with CSI-ReportConfig having report of 'No Report (or None)' or L1 RSRP.

If a terminal is configured with CSI-ReportConfig that reportQuantity is configured as 'cri-RSRP' or 'none' and CSI-ResourceConfig (a higher layer parameter resourcesForChannelMeasurement) for channel measurement includes NZP-CSI-RS-ResourceSet that a higher layer parameter 'repetition' is configured without including a higher layer parameter 'trs-Info', the terminal may be configured only with ports with the same number (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-

TABLE 6

```
ASN1START
TAG-CSI-RESOURCECONFIG-START
CSI-ResourceConfig ::=          SEQUENCE {
   csi-ResourceConfigId         CSI-ResourceConfigId,
   csi-RS-ResourceSetList       CHOICE {
      nzp-CSI-RS-SSB            SEQUENCE {
         nzp-CSI-RS-ResourceSetList SEQUENCE (SIZE
(1..maxNrofNZP-CSI-RS-ResourceSetsPerConfig)) OF NZP-CSI-RS-ResourceSetId
OPTIONAL,
         csi-SSB-ResourceSetList SEQUENCE (SIZE
(1..maxNrofCSI-SSB-ResourceSetsPerConfig)) OF CSI-SSB-ResourceSetId
   OPTIONAL
      },
      csi-IM-ResourceSetList    SEQUENCE (SIZE (1..maxNrofCSI-IM-
ResourceSetsPerConfig)) OF CSI-IM-ResourceSetId
   },
   bwp-Id                       BWP-Id,
   resourceType                 ENUMERATED { aperiodic, semiPersistent,
periodic },
   ...
}
TAG-CSI-RESOURCECONFIGTOADDMOD-STOP
-- ASN1STOP
```

RS-ResourceSet may be transmitted to a different OFDM symbol. In addition, a terminal does not expect to receive a different periodicity for periodicityAndOffset in all CSI-RS resources within NZP-CSI-RS-Resourceset.

On the other hand, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and L1-RSRP corresponding to it to a base station.

And, when a CSI-RS resource is configured in the same OFDM symbol(s) as a SSB (a SS/PBCH Block) and 'QCL-TypeD' may be applied, the terminal may assume that a CSI-RS and a SSB are quasi co-located from a viewpoint of 'QCL-TypeD'.

Here, the QCL TypeD may mean that antenna ports are QCL-ed from a viewpoint of a spatial Rx parameter. When a terminal receives a plurality of DL antenna ports in a QCL Type D relationship, the same Rx beam may be applied. In addition, a terminal does not expect that a CSI-RS will be configured in a RE overlapped with a RE of a SSB.

Figure 9:
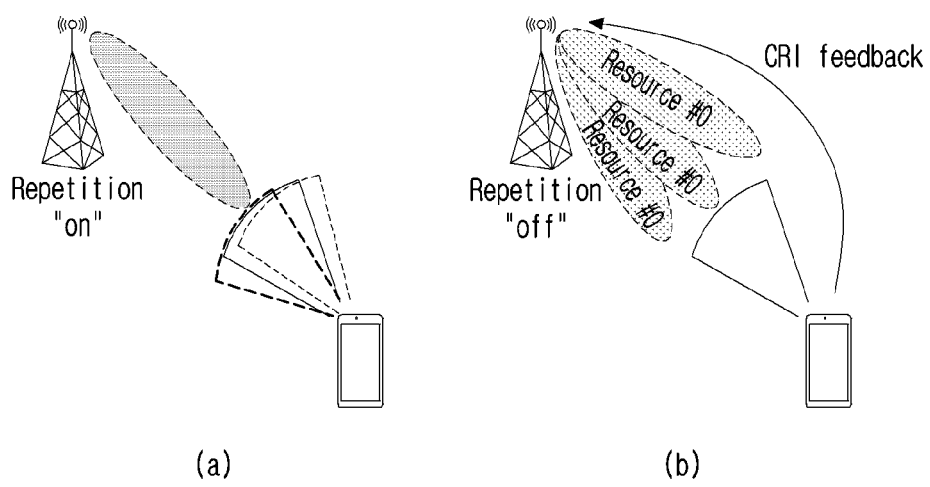
FIG. 9 is a diagram which illustrates a downlink beam management operation using a CSI-RS in a wireless communication system to which the present disclosure may be applied.

FIG. 9 is a diagram which illustrates a downlink beam management operation using a CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case in which a repetition parameter is configured as 'ON' and FIG. 9(b) is a case in which a repetition parameter is configured as 'OFF'.

Figure 10:
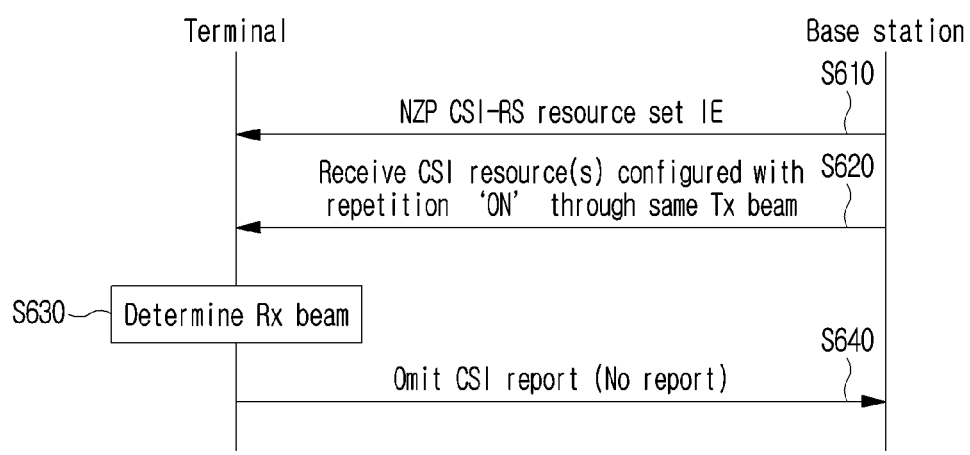
FIG. 10 is a diagram which illustrates a Rx beam determination process of a terminal in a wireless communication system to which the present disclosure may be applied.

FIG. 10 is a diagram which illustrates a Rx beam determination process of a terminal in a wireless communication system to which the present disclosure may be applied.

In reference to FIG. 9(a) and FIG. 10, a Rx beam determination process of a terminal is described.

A terminal receives a NZP CSI-RS resource set IE including a higher layer parameter repetition from a base station through RRC signaling S610. Here, the repetition parameter is configured as 'ON'.

A terminal repetitively receives resource(s) in a CSI-RS resource set configured as repetition 'ON' through the same Tx beam (or DL spatial domain transmission filter) of a base station in a different OFDM symbol S620.

A terminal determines its Rx beam S630.

A terminal omits CSI reporting S640. In this case, reportQuantity of a CSI reporting configuration may be configured as 'No report (or None).

In other words, the terminal may omit CSI reporting when it is configured as repetition 'ON'.

Figure 11:
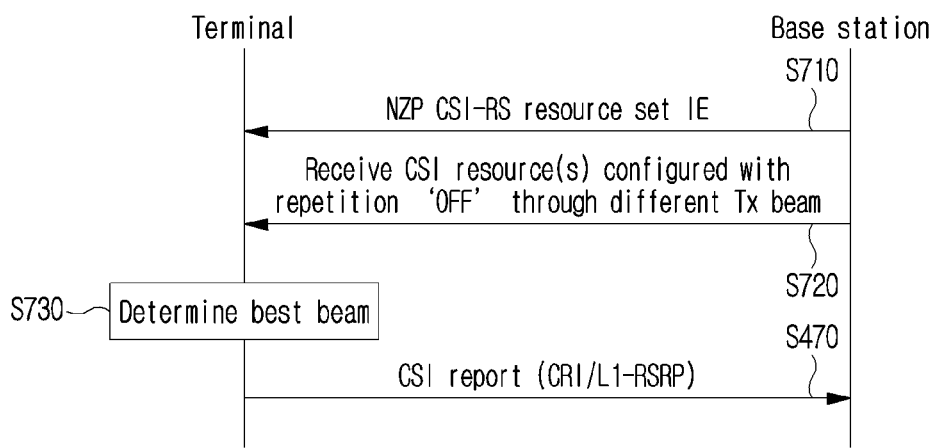
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives a NZP CSI-RS resource set IE including a higher layer parameter repetition from a base station through RRC signaling S710. Here, the repetition parameter is configured as 'OFF' and is related to a Tx beam sweeping procedure of a base station.

A terminal receives resource(s) in a CSI-RS resource set configured as repetition 'OFF' through a different Tx beam (DL spatial domain transmission filter) of a base station S720.

A terminal selects (or determines) the best beam S740.

A terminal reports an ID on a selected beam and relative quality information (e.g., L1-RSRP) to a base station S740. In this case, reportQuantity of a CSI reporting configuration may be configured as 'a CRI+L1-RSRP'.

In other words, when a CSI-RS is transmitted for BM, the terminal reports a CRI and L1-RSRP regarding it to a base station.

Figure 12:
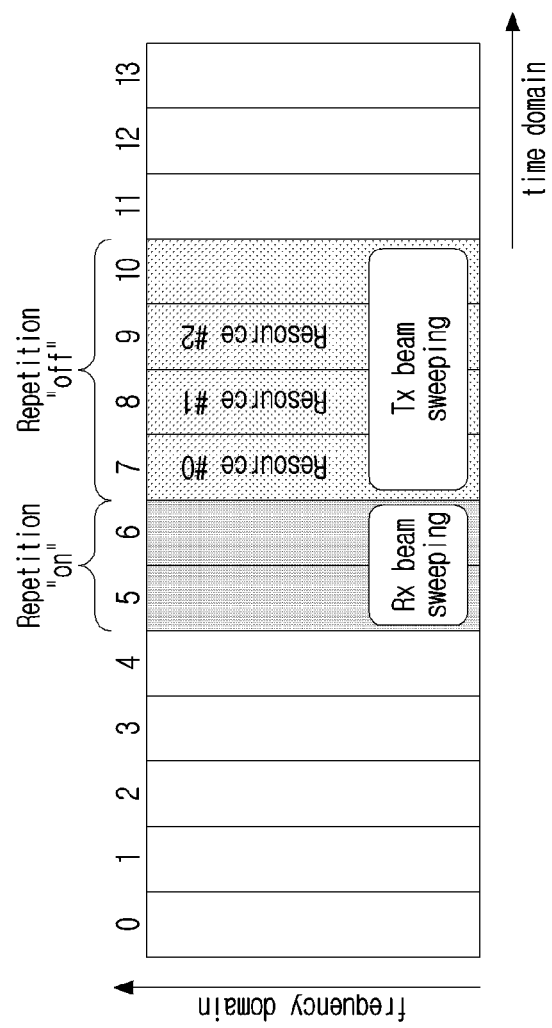
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it may be seen that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted by a different Tx beam.

Hereinafter, a downlink BM related beam indication method is described.

A terminal may receive a RRC configuration for a list on up to M candidate transmission configuration indication (TCI) states at least for a purpose of a QCL (Quasi Co-location) indication. Here, M may be 64.

Each TCI state may be configured as one RS set. Each ID of a DL RS for a spatial QCL purpose (QCL Type D) at least in a RS set may refer to one of DL RS types such as a SSB, a P(periodic)-CSI RS, a SP (semi-persistent)-CSI RS, an a(aperiodic)-CSI RS, etc.

An ID of DL RS(s) in a RS set used at least for a spatial QCL purpose may be initialized/updated at least through explicit signaling.

Table 7 illustrates a TCI-State information element (IE).

A TCI-State IE is associated with a quasi co-location (QCL) type corresponding to one or two DL reference signals (RS).

TABLE 7

```
-- ASN1START
-- TAG-TCI-STATE-START
TCI-State ::=            SEQUENCE {
   tci-StateId              TCI-StateId,
   qcl-Type1                QCL-Info,
   qcl-Type2                QCL-Info
       OPTIONAL, -- Need R
...
}
QCL-Info ::=             SEQUENCE {
   cell                     ServCellIndex
           OPTIONAL, -- Need R
   bwp-Id                   BWP-Id
           OPTIONAL, -- Cond CSI-RS-Indicated
   referenceSignal          CHOICE {
       csi-rs                   NZP-CSI-RS-ResourceId,
       ssb                      SSB-Index
   },
   qcl-Type             ENUMERATED {typeA, typeB, typeC, typeD},
...
}
-- TAG-TCI-STATE-STOP
-- ASN1STOP
```

In Table 7, a bwp-Id parameter represents a DL BWP (bandwidth part) where a RS is positioned, a cell parameter represents a carrier where a RS is positioned and a referencesignal parameter represents reference antenna port(s)

which become a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated to NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

In the UL BM, beam reciprocity (or beam correspondence) between a Tx beam and an Rx beam may or may not be established according to terminal implementation. If reciprocity between a Tx beam and an Rx beam is established in both a base station and a terminal, a UL beam pair may be aligned through a DL beam pair. However, when reciprocity between a Tx beam and an Rx beam is not established in either of a base station and a terminal, a UL beam pair determination process is required separately from a DL beam pair determination.

In addition, even when both a base station and a terminal maintain beam correspondence, a base station may use a UL BM procedure for DL Tx beam determination without a terminal requesting a report of a preferred beam.

UL BM may be performed through beamformed UL SRS transmission, and whether UL BM of an SRS resource set is applied is configured by (higher layer parameter) usage. When usage is configured to 'BeamManagement (BM)', only one SRS resource may be transmitted in each of a plurality of SRS resource sets at a given time instant.

A terminal may be configured with one or more Sounding Reference Symbol (SRS) resource sets configured by the (higher layer parameter) SRS-ResourceSet (through higher layer signaling, RRC signaling, etc.). For each SRS resource set, a UE may be configured with K≥1 SRS resources (higher layer parameter SRS-resource). Here, K is a natural number, and a maximum value of K is indicated by SRS_capability.

Like DL BM, a UL BM procedure may also be divided into Tx beam sweeping of a terminal and Rx beam sweeping of a base station.

Figure 13:
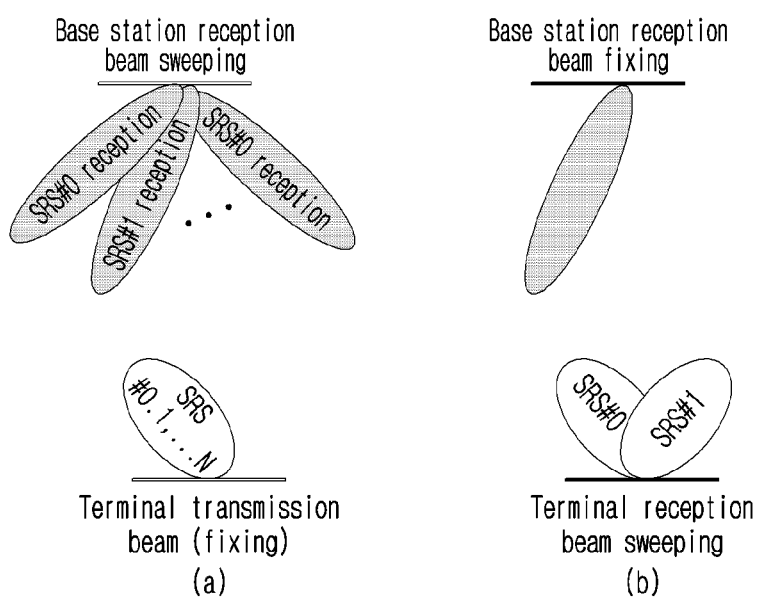
FIG. 13 is a diagram illustrating an uplink beam management operation using an SRS in a wireless communication system to which the present disclosure may be applied.

FIG. 13 is a diagram illustrating an uplink beam management operation using an SRS in a wireless communication system to which the present disclosure may be applied.

FIG. 13(a) illustrates an Rx beam determination operation of a base station, and FIG. 13(b) illustrates a Tx beam sweeping operation of a terminal.

Figure 14:
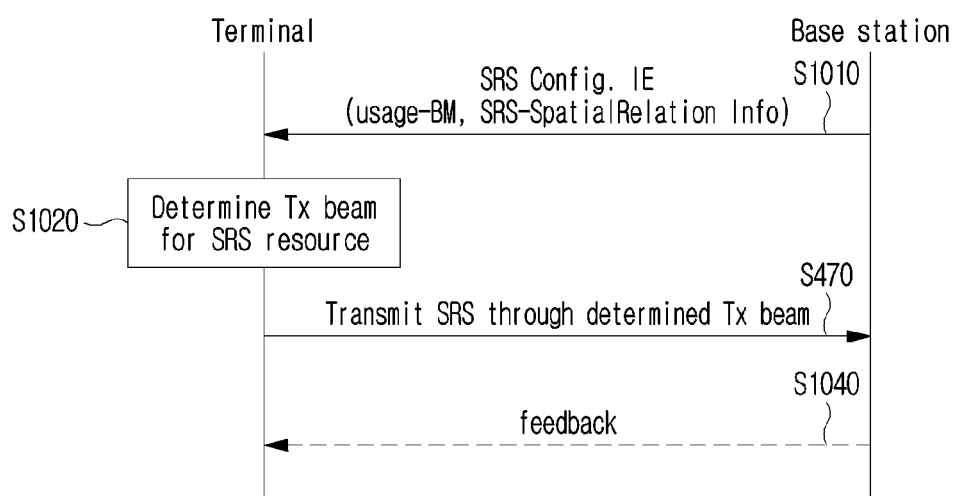
FIG. 14 is a diagram illustrating an uplink beam management procedure in a wireless communication system to which the present disclosure may be applied.
Figure 15:
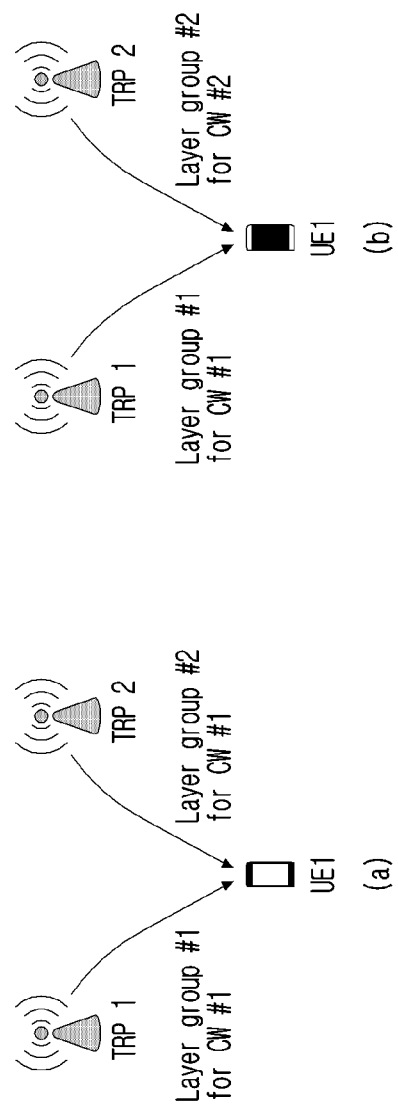
FIG. 15 illustrates a method of transmitting multiple TRPs in a wireless communication system to which the present disclosure may be applied.

FIG. 14 is a diagram illustrating an uplink beam management procedure in a wireless communication system to which the present disclosure may be applied.

A terminal receives RRC signaling (e.g., SRS-Config IE) including a usage parameter (higher layer parameter) configured with 'beam management' from a base station (S1010).

Table 8 shows an example of an SRS-Config IE (Information Element), and the SRS-Config IE is used for SRS transmission configuration. The SRS-Config IE includes a list of SRS-Resources and a list of SRS-ResourceSets. Each SRS resource set means a set of SRS-resources.

A network may trigger transmission of an SRS resource set using configured aperiodicSRS-ResourceTrigger (L1 DCI).

TABLE 8

```
-- ASN1START
-- TAG-MAC-CELL-GROUP-CONFIG-START
SRS-Config ::=                        SEQUENCE {
    srs-ResourceSetToReleaseList              SEQUENCE
(SIZE(1..maxNrofSRS-ResourceSets)) OF SRS-ResourceSetId
        OPTIONAL, -- Need N
    srs-ResourceSetToAddModList               SEQUENCE
(SIZE(1..maxNrofSRS-ResourceSets)) OF SRS-ResourceSet
        OPTIONAL, -- Need N
    srs-ResourceToReleaseList                 SEQUENCE
(SIZE(1..maxNrofSRS-Resources)) OF SRS-ResourceId
        OPTIONAL, -- Need N
    srs-ResourceToAddModList                  SEQUENCE
(SIZE(1..maxNrofSRS-Resources)) OF SRS-Resource
        OPTIONAL, -- Need N
    tpc-Accumulation                          ENUMERATED {disabled}
                                              OPTIONAL, -- Need S
    ...
}
SRS-ResourceSet ::=                   SEQUENCE {
    srs-ResourceSetId                         SRS-ResourceSetId,
    srs-ResourceIdList                        SEQUENCE
(SIZE(1..maxNrofSRS-ResourcesPerSet)) OF SRS-ResourceId
        OPTIONAL, -- Cond Setup
    resourceType                              CHOICE {
        aperiodic                             SEQUENCE {
            aperiodicSRS-ResourceTrigger          INTEGER
(1..maxNrofSRS-TriggerStates–1),
            csi-RS                                NZP-CSI-RS-
ResourceId                                    OPTIONAL, -- Cond
NonCodebook
            slotOffset                            INTEGER (1..32)
                                                  OPTIONAL, -- Need S
            ...
        },
        semi-persistent                       SEQUENCE {
            associatedCSI-RS                      NZP-CSI-RS-
ResourceId                                    OPTIONAL, -- Cond
```

TABLE 8-continued

```
NonCodebook
     ...
     },
     periodic                          SEQUENCE {
        associatedCSI-RS                  NZP-CSI-RS-
ResourceId                             OPTIONAL, -- Cond
NonCodebook
        ...
     }
  },
  usage                                ENUMERATED  {beamManagement,
codebook, nonCodebook, antennaSwitching},
  alpha                                Alpha
        OPTIONAL, -- Need S
  p0                                   INTEGER (-202..24)
                                       OPTIONAL, -- Cond Setup
  pathlossReferenceRS                     CHOICE {
     ssb-Index                            SSB-Index,
     csi-RS-Index                         NZP-CSI-RS-ResourceId
SRS-SpatialRelationInfo ::=             SEQUENCE {
  servingCellId                         ServCellIndex
        OPTIONAL, -- Need S
  referenceSignal                       CHOICE {
     ssb-Index                            SSB-Index,
     csi-RS-Index                         NZP-CSI-RS-ResourceId,
     srs                                  SEQUENCE {
        resourceId                           SRS-ResourceId,
        uplinkBWP                            BWP-Id
     }
  }
}
SRS-ResourceId ::=                     INTEGER (0..maxNrofSRS-
Resources-1)
```

In Table 8, usage represets a higher layer parameter indicating whether an SRS resource set is used for beam management, codebook-based or non-codebook-based transmission. The usage parameter corresponds to an L1 parameter 'SRS-SetUse'. 'spatialRelationInfo' is a parameter indicating a configuration of a spatial relation between a reference RS and a target SRS. Here, a reference RS may be an SSB, a CSI-RS, or an SRS corresponding to the L1 parameter 'SRS-SpatialRelationInfo'. The usage configured for each SRS resource set. A terminal determines a Tx beam for an SRS resource to be transmitted based on the SRS-SpatialRelation Info included in the SRS-Config IE (S1020). Here, SRS-SpatialRelation Info is configured for each SRS resource, and indicates whether to apply the same beam as a beam used in an SSB, a CSI-RS, or an SRS for each SRS resource. In addition, SRS-SpatialRelationInfo may or may not be configured in each SRS resource.

If the SRS-SpatialRelationInfo is configured in an SRS resource, the same beam as a beam used in an SSB, a CSI-RS or an SRS is applied and transmitted. However, if the SRS-SpatialRelationInfo is not configured in an SRS resource, the terminal arbitrarily determines a Tx beam and transmits an SRS through the determined Tx beam (S1030).

More specifically, for P-SRS in which 'SRS-ResourceConfigType' is configured to 'periodic':

i) When SRS-SpatialRelationInfo is configured with 'SSB/PBCH', a UE transmits a corresponding SRS resource by applying the same spatial domain transmission filter (or generated from a corresponding filter) as a spatial domain reception (Rx) filter used for reception of an SSB/PBCH; or ii) When SRS-SpatialRelationInfo is configured with 'CSI-RS', a UE transmits an SRS resource by applying the same spatial domain transmission filter used for reception of a periodic CSI-RS or an SP (semi-persistent) CSI-RS; or iii) When SRS-SpatialRelationInfo is configured with 'SRS', a UE transmits a corresponding SRS resource by applying the same spatial domain transmission filter used for transmission of a periodic SRS.

Similar to the above, even when 'SRS-ResourceConfigType' is configured with 'SP (semi-persistent)-SRS' or 'AP (aperiodic)-SRS', beam determination and transmission operation may be applied.

Additionally, a terminal may or may not receive feedback on an SRS from a base station as in the following three cases (S1040).

i) When Spatial_Relation_Info is configured for all SRS resources in an SRS resource set, a terminal transmits an SRS in a beam indicated by a base station. For example, when Spatial_Relation_Info all indicate the same an SSB, a CRI, or an SRI, a terminal repeatedly transmits an SRS in the same beam. This case corresponds to FIG. 13(a), for the purpose of a base station selecting an Rx beam.

ii) Spatial_Relation_Info may not be configured for all SRS resources in an SRS resource set. In this case, a terminal may freely transmit while changing an SRS beam. That is, this case corresponds to FIG. 13(b), for the purpose of a terminal sweeping a Tx beam.

iii) Spatial_Relation_Info may be configured only for some SRS resources in an SRS resource set. In this case, for the configured SRS resource, an SRS is transmitted with the indicated beam, and for the SRS resource for which Spatial_Relation_Info is not configured, a terminal may arbitrarily apply a Tx beam and transmit it.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement
NZP CSI-RS resource for interference measurement
NZP CSI-RS resource for channel measurement In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForinterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-TypeA and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the Method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at every transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPS transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), 1: a closed loop power control process index (up to 2 processes per cell)).

Hereinafter, MTRP eMBB is described.

In the present disclosure, MTRP-eMBB means that multiple TRPS transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N-1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. One PDCCH candidate partitively transmitted by a plurality of base stations (i.e., MTRPs) may be indicated to a terminal (UE) through a configuration described below or may be recognized or determined by a terminal.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

Method for Transmitting and Receiving Channel State Information

Hereinafter, examples of CSI-related operations for MTRP according to the present disclosure will be described. The CSI-related operation for MTRP according to the present disclosure may include example related to at least one of receiving configuration information related to a CSI report from a base station by a terminal, receiving a CSI-RS from a base station based on the configuration information, and calculating CSI based on the configuration information, or reporting the calculated CSI to the base station.

The configuration information related to the CSI report may include configuration information for the measurement of the channel and/or interference of the terminal and resources therefor, configuration information for the report of the terminal, and the like. CSI to be reported by the terminal may be configured by a higher layer through a report quantity parameter. For example, the report quantity parameter may indicate at least one of CQI (Channel Quality Information), PMI (Precoding Matrix Indicator), CRI (CSI-RS Resource Indicator), SSBRI (SS/PBCH Resource Block Indicator), LI (Layer Indicator), RI (Rank Indicator), or L1-RSRP.

Some parameters of 'CSI-ReportConfig', a higher layer parameter for configuring a CSI reporting method may be defined as in the following Table 9. Hereinafter, for convenience of a description, 'CSI-ReportConfig' may be referred to as a reporting setting.

TABLE 9

ASN1START
TAG-CSI-REPORTCONFIG-START
CSI-ReportConfig ::=                SEQUENCE {
reportConfigId                      CSI-ReportConfigId,
carrier                             ServCellIndex
OPTIONAL, -- Need S
resourcesForChannelMeasurement      CSI-
ResourceConfigId,
csi-IM-ResourcesForInterference     CSI-ResourceConfigId
OPTIONAL, -- Need R
nzp-CSI-RS-ResourcesForInterference CSI-ResourceConfigId
OPTIONAL, -- Need R
reportConfigType                    CHOICE {
i) periodic                         SEQUENCE {
reportSlotConfig                    CSI-
ReportPeriodicityAndOffset,
pucch-CSI-ResourceList              SEQUENCE (SIZE
(1..maxNrofBWPs)) OF PUCCH-CSI-Resource
ii) },
iii) semiPersistentOnPUCCH          SEQUENCE {
reportSlotConfig                    CSI-
ReportPeriodicityAndOffset,
pucch-CSI-ResourceList              SEQUENCE (SIZE
(1..maxNrofBWPs)) OF PUCCH-CSI-Resource In reference to FIG. 9, one reporting setting may include up to 3 'CSI-ResourceConfig's. For convenience, 'CSI-ResourceConfig' may be referred to as a resource setting. According to a time domain behavior of a reporting setting and the number of resource settings configured in a reporting setting, usage of each resource setting may be defined as in the following Table 10.

TABLE 10

For aperiodic CSI, each trigger state configured by using a higher layer parameter 'CSI-AperiodicTriggerState' is associated with one or multiple 'CSI-ReportConfig's and here, each 'CSI-ReportConfig' is linked to periodic, semi-persistent or aperiodic resource setting(s):
When one resource setting is configured, the resource setting (given by a higher layer parameter 'resourcesForChannelMeasurement') is for channel measurement for L1-RSRP (reference signal received power) or for channel and interference measurement for L1-SINR (signal interference noise ratio) computation.
When two resource settings are configured, a first resource setting (given by a higher layer parameter 'resourcesForChannelMeasurement') is for channel measurement and a second resource setting (given by a higher layer parameter 'csi-IM-ResourcesForInterference' or a higher layer parameter 'nzp-CSI-RS-ResourcesForInterference') is for interference measurement performed in CSI-IM (interference measurement) or a NZP CSI-RS.
When three resource settings are configured, a first resource setting (given by a higher layer parameter 'resourcesForChannelMeasurement') is for channel measurement and a second resource setting (given by a higher layer parameter 'csi-IM-ResourcesForInterference') is for CSI-IM based on interference measurement and a third resource setting (given by a higher layer parameter 'nzp-CSI-RS-ResourcesForInterference') is for interference measurement based on a NZP CSI-RS.
For semi-persistent or periodic CSI, each 'CSI-ReportConfig' is linked to periodic or semi-persistent resource setting(s):
When one resource setting (given by a higher layer parameter 'resourcesForChannelMeasurement') is configured, the resource setting is for channel measurement for L1-RSRP or for channel and interference measurement for L1-SINR computation.
When two resource settings are configured, a first resource setting (given by a higher layer parameter 'resourcesForChannelMeasurement') is for channel measurement and a second resource setting (given by a higher layer parameter 'csi-IM-ResourcesForInterference') is for interference measurement performed in CSI-IM (interference measurement). For L1-SINR computation, a second resource setting (given by a higher layer parameter 'csi-IM-ResourcesForInterference' or a higher layer parameter 'nzp-CSI-RS-ResourceForInterference') is used for interference measurement performed in CSI-IM or a NZP CSI-RS.

As described above, one resource setting tor channel measurement (CM) may be configured for aperiodic (AP) CSI. In addition, one resource setting for CM may be configured for semi-persistent or periodic CSI. In addition, for a Periodic/semi-persistent (P/SP) CSI resource setting, the number of CSI-RS resource sets which may be configured for a resource setting is limited to 1. For an AP CSI resource setting, a plurality of CSI-RS resource sets may be configured, but one resource set of a plurality of resource sets is selected for each reporting setting when configuring a trigger state.

For example, one CMR set for a channel measurement, and one IMR set for an interference measurement may be configured per a reporting setting.

Hereinafter, a method of defining a resource group in a resource set is described.

For M resource groups (RG) in a resource set, each RG may be configured with one or more resources.

Table 11 illustrates a NZP-CSI-RS-RESOURCESET information element which defines a resource set.

TABLE 12

```
ASN1START
TAG-NZP-CSI-RS-RESOURCESET-START
NZP-CSI-RS-ResourceSet ::=    SEQUENCE {
nzp-CSI-ResourceSetId         NZP-CSI-RS-
ResourceSetId,
nzp-CSI-RS-Resources          SEQUENCE (SIZE
(1..maxNrofNZP-CSI-RS-ResourcesPerSet)) OF NZP-CSI-RS-
ResourceId,
repetition                    ENUMERATED { on, off }
OPTIONAL,   -- Need S
aperiodicTriggeringOffset     INTEGER(0..6)
OPTIONAL,   -- Need S
trs-Info                      ENUMERATED {true}
OPTIONAL,   -- Need R
...,
[[
aperiodicTriggeringOffset-r16  INTEGER(0..31)
OPTIONAL  -- Need S
]]
}
TAG-NZP-CSI-RS-RESOURCESET-STOP
-- ASN1STOP
```

Hereinafter, in the present disclosure, for convenience of description, it is assumed that two TRPs (e.g., TRP1/TRP2) operate. However, this assumption does not limit the technical scope of the present disclosure.

In the CSI configuration for the UE and the CSI reporting operation of the UE, one TRP may correspond to one report setting. For example, in the CSI setting and reporting operation, one or more TRPs may respectively correspond to one or more report settings configured to the UE. In addition, each report setting may be associated with a configuration for one CMR and one IMR. For example, the CSI reporting configurations for the first TRP (or TRP 1) and the second TRP (or TRP 2) may correspond to a first report setting and a second report setting, and the first report setting may include or be associated with the first CMR (or CMR 1) and a first IMR (or IMR 1), and the second report setting may include or be associated with a second CMR (or CMR 2) and a second IMR (or IMR 2).

In the current NR wireless communication system, a separate CSI calculation/reporting scheme for eMBB MTRP PDSCH transmission cannot be configured. That is, the base station may configure to the UE a CSI calculation/reporting scheme for single TRP PDSCH transmission, and may receive CSI from the UE based on the above.

In the following examples, when the base station configures a pair of a resource for channel measurement (CMR) and a resource for interference measurement (IMR) to the UE, this is expressed as {CMR, IMR}. For example, when the CSI resource set includes a plurality of CSI resources (e.g., resource A, resource B, . . . ), among them, the resource configured as CMR and the resource configured as IMR are indicated to the UE by the base station. If resource A is configured as CMR and resource B is configured as IMR, {CMR, IMR} may be expressed as {A, B}. Alternatively, when resource B is configured as CMR, and resource A is configured as IMR, {CMR, IMR} may be expressed as {B, A}. That is, in the examples of the present disclosure, a pair of a channel measurement resource and an interference measurement resource is sequentially expressed as {CMR, IMR}.

For example, the base station may configure to the UE a pair {CMR 1, IMR 1} of a resource for measuring a channel of TRP 1 (e.g., CMR 1) and a resource for measuring an interference (e.g., IMR 1). In addition, the base station may configure to the UE a pair {CMR 2, IMR 2} of a resource for measuring a channel of TRP 2 (e.g., CMR 2) and a resource for measuring an interference (e.g., IMR 2). Accordingly, the UE may calculate/report the CSI (e.g., CSI 1) of TRP 1 using CMR 1 and IMR 1 of TRP 1. In addition, the UE may calculate/report the CSI (e.g., CSI 2) of TRP 2 using CMR 2 and IMR 2 of TRP 2. The base station may perform data link adaptation and scheduling using CSI 1 and CSI 2 reported by the UE.

Here, CSI 1 and CSI 2 only reflect channels from TRP 1 and TRP 2, respectively, and cannot reflect interference between the two TRPs. Accordingly, since the base station cannot determine the channel state due to the interference between the two TRPs, it may be difficult to optimize the link adaptation and the scheduling of the base station. In order to solve this problem, various methods are considered as follows.

Joint CSI Calculation/Reporting

In this example, it is assumed that the base station configures to the UE {CMR 1, IMR 1} for TRP 1 and {CMR 2, IMR 2} for TRP 2. Here, the base station may configure to the UE a link relationship (linkage) between {CMR 1, IMR 1} and {CMR 2, IMR 2}.

When the linkage is configured, it is assumed that, when the UE calculates CSI for TRP 1, the transmission data of TRP 2 acts as interference through the channel measured by the CMR of TRP 2 by applying the RI/PMI of TRP 2. In addition, when the linkage is configured, the UE assumes that, when calculating the CSI for TRP 2, the transmission data of TRP 1 acts as interference through the channel measured by the CMR of TRP 1 by applying the RI/PMI of TRP 1.

As a result, the UE may calculate/report the optimal CSI considering the data layer interference between each TRP. However, since the RI/PMI of TRP 1 and the RI/PMI of TRP 2 are required to be calculated together, there is a problem in that the amount of computation of the UE increases. For example, when one of RI={1, 2}, PMI={1, 2, 3, 4} is selected for RI/PMI of TRP 1, and one of RI={1, 2}, PMI={1, 2, 3, 4} is selected for RI/PMI of TRP 2, the UE is required to find an optimal RI/PMI among 2×4×2×4 RI/PMI combinations. That is, a problem of increasing UE computational complexity may occur.

NZP IMR-Based CSI Calculation/Reporting

Figure 16:
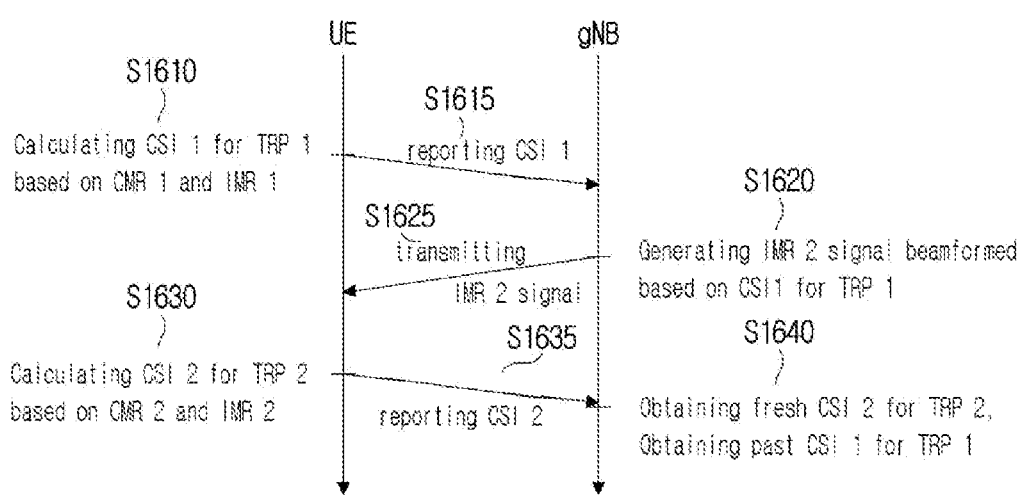
FIG. 16 is a diagram illustrating an operation related to NZP IMR based CSI to which the present disclosure may be applied.

FIG. 16 is a diagram illustrating an operation related to NZP IMR-based CSI to which the present disclosure may be applied.

In this example, it is assumed that the base station configures to the UE {CMR 1, IMR 1} for TRP 1, and configures {CMR 2, IMR 2} for TRP 2. Here, the linkage between {CMR 1, IMR 1} and {CMR 2, IMR 2} is not configured.

In addition, for the IMR of each TRP, NZP IMR (i.e., NZP CSI-RS based IMR) may be configured, and additionally ZP IMR may be configured together. If ZP IMR is additionally configured, interference measured based on ZP IMR may be additionally used for CSI calculation.

The UE may calculate CSI 1 for TRP 1 using CMR 1 and NZP (or NZP and ZP) IMR 1 of TRP 1 (i.e., based on {CMR 1, IMR 1}) (S1610). The UE may transmit the calculated CSI 1 to the base station (gNB) (S1615).

The base station may generate a beamformed IMR 2 signal (e.g., NZP CSI-RS) based on CSI 1 for TRP 1 reported by the UE (S1620). The base station may transmit a signal (e.g., NZP CSI-RS) to the UE on IMR 2 (S1625). Here, the beamforming may include applying a port-wise precoding to the signal (e.g., NZP CSI-RS) transmitted by the base station on IMR 2 using CSI 1 for TRP 1 previously received from the UE.

The UE may calculate CSI 2 for TRP 2 using CMR 2 and IMR 2 (i.e., based on {CMR 2, IMR 2}) (S1630). Here, since a signal beamformed based on CSI 1 from TRP 1 is transmitted on IMR 2, the UE may calculate CSI 2 of TRP 2 to which interference from TRP 1 is reflected. The UE may transmit the calculated CSI 2 to the base station (S1635).

If the UE reported CSI 2 for TRP 2 to the base station before step S1610, the base station transmits a signal by applying a beamforming (or port-wise precoding) to IMR 1 for TRP 1 based on CSI 2 for TRP 2, and accordingly, the UE may calculate CSI 1 of TRP 1 reflecting interference from TRP 2 and transmit it in step S1610.

As a result, CSI 2 for TRP 2 obtained by the base station is information reflecting the fresh channel state, whereas CSI 1 for TRP 1 is information reflecting the outdated channel state (S1640).

That is, there is a problem in that, if the CSI for one TRP is calculated, the CSI for the other TRP indicates the past channel state, that is, inaccurate channel state information.

For example, in a case of, after calculating CSI 1 for TRP 1 in slot n, and then calculating CSI 2 for TRP 2 in slot n+k, interference of TRP 2 applying CSI 2 of TRP 2 calculated in slot n+k cannot be reflected to the CSI 1 of TRP 1. That is, in CSI 1 of TRP 1, data to which RI 2/PMI 2 of TRP 2 reported/calculated before slot n+k time is applied is reflected as interference. However, since RI 2/PMI 2 of TRP 2 is newly updated at slot n+k, CSI 1 of TRP 1 may be calculated inaccurately.

In order to solve the above problem, the present disclosure may use interference-based CQI. Hereinafter, a detailed method of defining the interference-based CQI, and calculating and reporting it will be described.

Interference-Based CQI Calculation/Reporting

Figure 17:
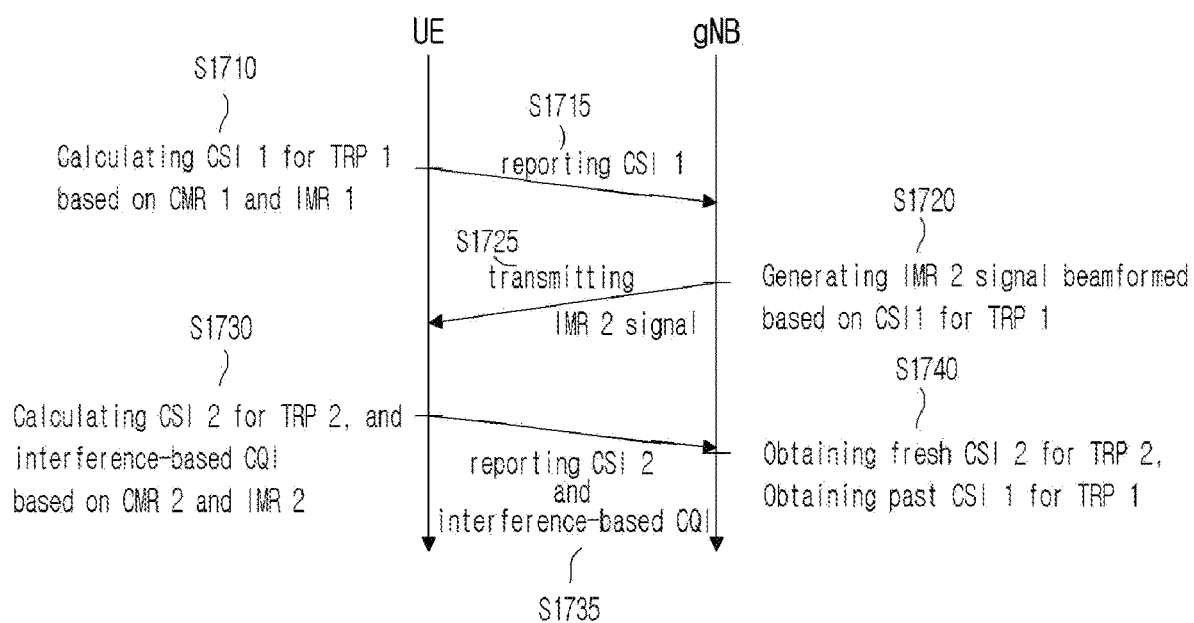
FIG. 17 is a diagram illustrating an operation related to CSI including interference based CQI according to an embodiment of the present disclosure.

FIG. 17 is a diagram illustrating an operation related to CSI including interference based CQI according to an embodiment of the present disclosure.

In the following examples, an interference-based CQI is also referred to as an inverse CQI, but the scope of the present disclosure is not limited by the name.

It is assumed that the base station configures to the UE {CMR 1, IMR 1} for TRP 1 to the UE, and configures {CMR 2, IMR 2} for TRP 2. Here, the linkage between {CMR 1, IMR 1} and {CMR 2, IMR 2} is not configured.

In addition, for IMR of each TRP, NZP IMR (i.e., NZP CSI-RS based IMR) may be configured, and additionally ZP IMR may be configured together. If ZP IMR is additionally configured, interference measured based on ZP IMR may be additionally used for CSI calculation. In the following examples, the term simply expressed as IMR includes NZP IMR, or both NZP and ZP IMR.

It is also assumed that calculation and/or reporting of CSI 1 for TRP 1 is performed in slot n, and calculation and/or reporting of CSI 2 for TRP2 is performed in slot n+k. Here, a slot is only an example of a time domain resource unit, and time domain resource units of different granularity may be applied. In addition, k is an integer greater than or equal to 1, meaning that slot n+k is located later in the time domain than slot n, and the range of the value of k may be given as an appropriate value according to system requirements or terminal capabilities. In addition, the time order of calculation/reporting of CSI 1 for TRP 1 and calculation/reporting of CSI 2 for TRP 2 is merely exemplary, and the present examples include various orders of CSI calculations/reports for different TRPs are performed at different points in time.

Steps S1710, S1715, S1720, and S1725 in the example of FIG. 17 are the same as steps S1610, S1615, S1620, and S1625 in the example of FIG. 16, and thus overlapping descriptions are omitted.

In step S1730, for example, when the UE calculates CSI 2 for TRP 2 in slot n+k, {CMR 2, IMR 2} for TRP 2 may be used. Here, the base station may apply a beamforming (or port-wise precoding) to a signal (e.g., NZP CSI-RS) transmitted on IMR 2 based on CSI 1 for TRP 1 received from the UE in the past (e.g., in slot n). Therefore, the interference of TRP 1 may be reflected to CSI 2 for TRP 2 calculated by the UE based on {CMR 2, IMR 2}.

Additionally, the UE may calculate the interference-based CQI (or inverse CQI) by assuming that IMR 2 for TRP 2 is the CMR and CMR 2 of TRP 2 is the IMR. That is, the inverse CQI corresponds to the CQI calculated based on {IMR 2, CMR 2}. On the other hand, the CQI for TRP 2 as previously defined corresponds to the CQI calculated based on {CMR 2, IMR 2}. That is, the interference-based CQI (or inverse CQI) corresponds to a new CQI differentiated from the previously defined CQI.

When the UE calculates the inverse CQI for a specific TRP, the CMR in the CSI calculation for the specific TRP may be applied (or assumed) as the IMR in the inverse CQI calculation, and the IMR in the CSI calculation for the specific TRP may be applied (or assumed) as the CMR in the in the inverse CQI calculation. Accordingly, the CSI for the specific TRP may indicate the state of a desired channel from the specific TRP to the UE, and the inverse CQI for the specific TRP may indicate the degree of interference that the UE experiences from the specific TRP. That is, according to the present disclosure, the UE may report to the base station new information indicating the degree of interference from a specific TRP which is not included in the conventional CSI.

When the UE calculates the Inverse CQI, an identity matrix may be applied (or assumed) as a precoder for the channel measured based on the NZP IMR (i.e., CSI-RS/resource assumed to be CMR) of a specific TRP, to estimate a port-wise channel. For example, when the NZP IMR is an NZP CSI-RS configured with n ports (i.e., an n-port NZP CSI-RS), an n×n identity matrix may be applied as the PMI. As a result, each port-wise channel becomes a channel through which each layer of another TRP is transmitted, and the UE may calculate the inverse CQI by assuming that it is a desired channel rather than an interference channel.

When the UE calculates the Inverse CQI, the previously calculated CSI of the specific TRP may be applied to the channel measured based on CMR (i.e., CSI-RS/resource assumed as IMR), it may be assumed (or reflected) as interference. For example, when (RI, PMI) of TRP 2 is calculated as (2,4), an effective channel may be generated by the precoder with RI=2 and PMI=4 being applied to the channel measured based on CMR, and it is assumed that interference of rank 2 (i.e., the number of layers is 2) occurs through the effective channel, and the above may be reflected to the inverse CQI calculation.

As a result, the inverse CQI means an achievable CQI, in a case assuming that TRP 1 transmits data in consideration of the recently reported (e.g., calculated/reported from UE in slot n) CSI 1 (especially RI 1 and/or PMI 1) of TRP 1, and assuming that data transmitted by TRP 2 by applying CSI 2 (e.g., calculated/reported from UE in slot n) of TRP 2 as interference. RI 1/PMI 1 of CSI 1 of TRP 1 calculated/reported in the past slot n was not calculated in consideration of fresh CSI 2 of the TRP 2 calculated in slot n+k, but CQI 1 may be updated based on the Inverse CQI calculated/reported together with CSI 2 of TRP 2.

In the above-described examples, CSI calculation/reporting based on the assumption that two TRPs transmit different codewords (CW) has been described. For example, in a transmission scheme in which two TRPs (e.g., TRP 1 and TRP 2) transmit respective PDSCHs scheduled by respective DCIs (e.g., multiple DCI-based MTRP PDSCH transmission scheme), TRP 1 may be scheduled using RI 1/PMI 1 and Inverse CQI of TRP 1, and TRP 2 may be scheduled using RI 2/PMI 2/CQI 2 of TRP 2.

In a transmission scheme that two TRPs transmit one same CW (e.g., a single DCI-based eMBB MTRP PDSCH transmission scheme), Inverse CQI and CQI 2 of TRP 2 are not separately calculated/reported, and may be calculated/reported in the form of one CQI (i.e., a composite CQI). The UE may assume that some bit streams constituting one CW are transmitted through a channel measured based on CMR 2 by applying RI 2/PMI 2 of TRP 2, and also assume that interference measured based on (NZP) IMR 2 is received. It is assumed that the remaining bit streams of the one CW are transmitted through a channel measured based on (NZP) IMR 2 by applying an n×n identity matrix, and that interference is received by transmission to which RI 2/PMI 2 of TRP 2 is applied through a channel measured based on CMR 2.

Inverse CQI may be reported on the same PUCCH/PUSCH (e.g., in the same transmission opportunity) together with CSI 2 of TRP 2. Alternatively, inverse CQI may be reported at a different transmission opportunity (or time point) than CSI 2 for TRP 2. In addition, the base station may configure to the UE, through RRC/MAC-CE/DCI or the like, whether or not to additionally calculate/report inverse CQI (or whether to include inverse CQI in reportQuantity, or a predetermined condition for triggering inverse CQI report). In addition, the base station may provide the UE with configuration information related to inverse CQI calculation/reporting. For example, since the inverse CQI is an additional CQI, in order to reduce overhead of uplink control information (UCI) transmission, it may be configured to be always reported as a wideband (WB) CQI. For example, the UE may be configured/instructed to report CQI 2 of TRP 2 and report a difference value (e.g., delta value) between CQI 2 and inverse CQI.

In the above-mentioned examples, for convenience of explanation, the example of calculating/reporting inverse CQI is mainly described, and when composite CQI is used instead of the inverse CQI, all descriptions related to the inverse CQI may be applied to composite CQI.

In addition, the above-mentioned examples, for convenience of explanation, are described on the assumption that reporting together with inverse CQI (or composite CQI to which inverse CQI is reflected) in calculation/reporting of CSI 2 of TRP 2, and likewise CSI 1 of TRP 1 may also be calculated/reported together with inverse CQI (or composite CQI to which inverse CQI is reflected). For example, when the UE calculates/reports CSI 1 for TRP 1, it may calculate inverse CQI based on {IMR 1, CMR 1}. More specifically, in the inverse CQI calculation, the UE may assume the measured channel based on assumption that IMR 1 of TRP 1 is CMR and that port-wise precoding is applied, as a desired channel associated with inverse CQI. In addition, in the inverse CQI calculation, the UE may assume the effective channel to which previously reported CSI 1 of TRP 1 (e.g., RI 1/PMI 1) based on the assumption that CMR 1 of TRP 1 IMR, as an interference channel associated with inverse CQI. Accordingly, the UE may calculate the inverse CQI based on the desired channel and the interference channel associated with the inverse CQI. Such inverse CQI means a achievable CQI by a transmission from TRP 2 assuming interference due to transmission from TRP 1, and the base station may update CQI 2 based on the inverse CQI.

In addition, in the above-described examples, for convenience of description, the operation of two TRPs (e.g., TRP 1 and TRP 2) is mainly described, and for the case of three or more TRPs, in calculating/reporting CSI for one specific TRP, the inverse CQI associated with each of the remaining two or more TRPs may be calculated/reported. Based on such inverse CQI, the base station may update the CQI for each of the remaining two or more TRPs.

In the examples of the present disclosure, the description based on TRP may be replaced with expressions such as a panel, a cell, a TP (transmission point), a base station (or gNB, etc.) and applied. In addition, as described above, the TRP may be distinguished according to information (e.g., index) on the CORESET group (or CORESET pool). As an example, when one terminal is configured to perform transmission and reception with a plurality of TRPs (or cells), this may mean that a plurality of CORESET groups (or CORESET pools) are configured for the one terminal. The configuration of such a CORESET group (or CORESET pool) may be performed through higher layer signaling (e.g., RRC signaling, etc.). In addition, when a plurality of CORESET groups are configured for one terminal, the corresponding terminal may be configured or defined to receive data using a multi-DCI-based M-TRP operation.

Figure 18:
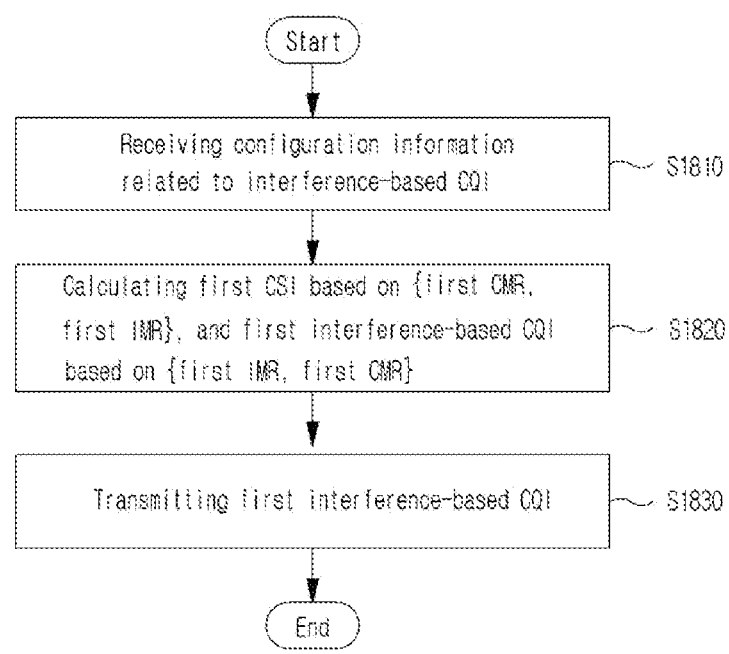
FIG. 18 is a flow chart illustrating transmitting interference based CQI according to the present disclosure.

FIG. 18 is a flow chart illustrating transmitting interference based CQI according to the present disclosure.

In step S1810, a terminal may receive configuration information related to interference-based CQI (e.g., inverse CQI) calculation/reporting from a base station. Configuration information related to interference-based CQI calculation/reporting may be included in CSI-related configuration information. The CSI-related configuration information may include a configuration for a first TRP (e.g., a first CSI report configuration) and a configuration for a second TRP (e.g., a second CSI report configuration).

In step S1820, the terminal may calculate the first CSI based on the first CMR and the first IMR for the first TRP (or based on the first CSI report configuration). The first CSI may include a first CQI calculated based on assuming the first CMR as the CMR and assuming the first IMR as the IMR (i.e., calculated based on {the first CMR, the first IMR}). In addition, when interference-based CQI calculation/reporting is configured, the terminal may calculate the first interference-based CQI calculated based on assuming the first IMR as the CMR and assuming the first CMR as the IMR (i.e., calculated based on {first IMR, first CMR}).

In step S1830, the terminal may transmit the first interference-based CQI together with or separately from the first CSI to the base station.

The first interference-based CQI corresponds to an achievable CQI by a transmission of the second TRP considering interference from the first TRP (or based on the first CSI report configuration), and based on the first interference-based CQI, the base station may update the second CSI (e.g., the second CQI) for the second TRP (or based on the second CSI report configuration).

Not shown in FIG. 18, additionally, the terminal may calculate the second CSI based on the second CMR and the second IMR for the second TRP (or based on the second CSI report configuration). The second CSI may include a second CQI calculated based on assuming the second CMR as the CMR and the second IMR as the IMR (i.e., calculated based on {second CMR, second IMR}). In addition, when interference-based CQI calculation/reporting is configured, the terminal may calculate the second interference-based CQI calculated based on assuming the second IMR as the CMR and assuming the second CMR as the IMR (i.e., calculated based on {second IMR, second CMR}).

The second interference-based CQI corresponds to an achievable CQI by a transmission of the first TRP considering interference from the second TRP (or based on the second CSI report configuration), and based on the second interference-based CQI, the base station may update the first CSI (e.g., the first CQI) for the first TRP (or based on the first CSI report configuration).

In the above-described examples, CQI may be calculated based on SINR, and SINR may be defined as a ratio of a desired signal to interference and noise. For example, the ratio can be calculated by putting the desired signal component in the numerator and putting the interference component and noise component in the denominator. In a general CQI, a value measured through CMR may be reflected in a numerator (i.e., a desired signal component), and a value measured through IMR may be reflected in a denominator (i.e., an interference component). In contrast, in the interference-based CQI, a value measured through IMR may be reflected in a numerator (i.e., a desired signal component), and a value measured through CMR may be reflected in a denominator (i.e., an interference component).

For example, in calculating the first interference-based CQI, assuming the first IMR as the CMR may mean assuming the first IMR as a numerator (i.e., a desired signal component) in the SINR calculation. Here, a precoding based on the identity matrix may be applied to the channel measured through the first IMR. In addition, in calculating the first interference-based CQI, assuming the first CMR as the IMR may mean assuming the first CMR as the denominator (i.e., an interference component) in the SINR calculation. Here, a precoding based on the first CSI (e.g., the first RI and/or the first PMI) may be applied to the channel measured through the first CMR.

For example, in calculating the second interference-based CQI, assuming the second IMR as the CMR may mean assuming the second IMR as a numerator (i.e., a desired signal component) in the SINR calculation. Here, a precoding based on the identity matrix may be applied to the channel measured through the second IMR. In addition, in calculating the second interference-based CQI, assuming the second CMR as the IMR may mean assuming the second CMR as a denominator (i.e., an interference component) in the SINR calculation. Here, a precoding based on the second CSI (e.g., the second RI and/or the second PMI) may be applied to the channel measured through the second CMR.

Figure 19:
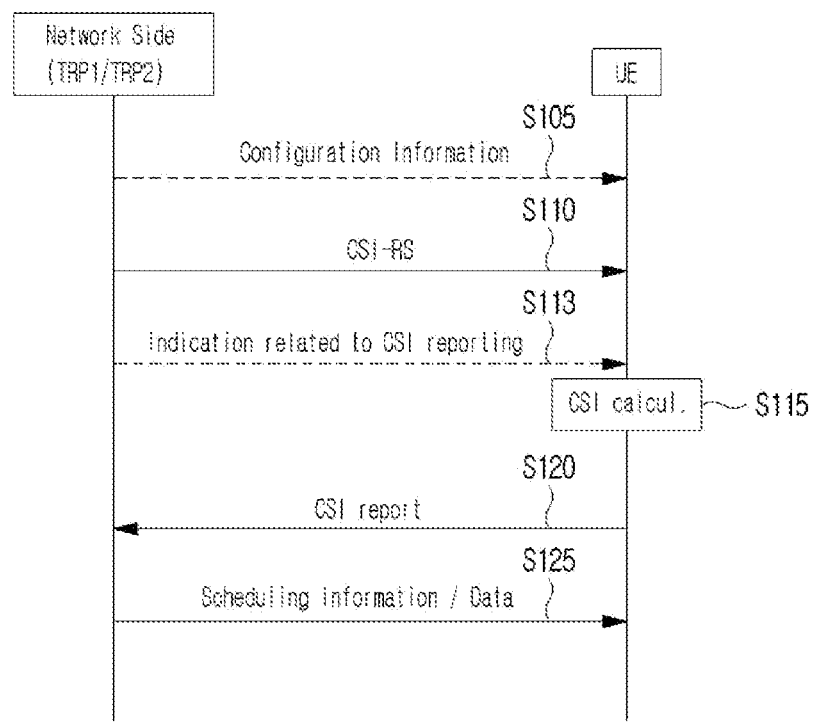
FIG. 19 is a diagram illustrating a signaling procedure between a terminal and a network side to which the present disclosure may be applied.

FIG. 19 is a diagram illustrating a signaling procedure between a terminal and a network side to which the present disclosure may be applied.

FIG. 19 shows a signaling procedure between the network side (e.g., TRP 1/TRP 2) and the UE in a context of multiple TRPs (M-TRP) to which the methods described in the present disclosure (e.g., embodiments related to interference-based CQI calculation/reporting, etc.) may be applied. Here, the UE and/or the network side is merely an example, and may be substituted for the various devices of FIG. 20.

Example of FIG. 19 is merely for convenience of description, and does not limit the scope of the present disclosure. Referring to FIG. 19, it is assumed that the UE performs CSI reporting according to the configuration and/or instruction of the network side (e.g., TRP 1/TRP 2). The CSI reporting may be configured as periodic/aperiodic/semi-persistent. Also, some step(s) shown in FIG. 19 may be omitted depending on circumstances and/or configurations.

Referring to FIG. 19, signaling between two TRPs and a UE is considered for convenience of description, but the corresponding signaling scheme may be of course extended and applied to signaling between multiple TRPs and multiple UEs. In the following description, the network side may be one base station including a plurality of TRPs, and may be one cell including a plurality of TRPs. For example, between TRP 1 and TRP 2 included in the network side, an ideal/non-ideal backhaul may be configured. In addition, the following description will be described based on a plurality of TRPs, which may be equally extended and applied to transmission through a plurality of panels. In addition, in the present disclosure, the operation of the UE receiving a signal from TRP 1/TRP 2 may be (interpreted/explained as) an operation for the UE to receive a signal from the network side (e.g., through/using TRP 1/TRP 2), and the operation of the UE transmitting a signal to TRP 1/TRP 2 may be (interpreted/explained as) an operation for the UE to transmit a signal to the network side (e.g., through/using TRP 1/TRP 2), and vice versa.

The UE may receive configuration or configuration information through/using TRP 1 and/or TRP 2 from the network side (S105). The configuration may include system information (SI)/scheduling information/CSI-related configuration (e.g., CSI reporting setting, CSI/CSI-RS resource setting, etc.). The configuration may include information related to the configuration of the network side (e.g., TRP configuration), resource information related to multiple TRP-based transmission and reception (e.g., resource allocation), or the like. The Configuration may be transmitted through a higher layer signaling (e.g., RRC information element, MAC-CE, etc.). In addition, when the configuration is predefined or preconfigured for the UE, the corresponding step may be omitted.

For example, the configuration may include configuration/indication information for CSI calculation/acquisition/reporting in consideration of multi-TRP transmission based on the above-described proposed methods (e.g., embodiments related to interference-based CQI calculation/reporting, etc.). For example, the configuration may include resource information (e.g., CMR/IMR information) for CSI calculation/measurement for each TRP. In addition, linkage information between resource information for each TRP may be included. For example, the configuration may include configuration/indication (e.g., whether to calculate or not/reporting method, etc.) related to calculation/reporting of inverse CQI/composite CQI.

For example, the operation in which the UE (100 or 200 in FIG. 20) receives the configuration from the network side (200 or 100 in FIG. 20) in the above-described step S105 may be implemented by the apparatus of FIG. 20 to be described below. For example, referring to FIG. 20, one or more processors 102 may control one or more transceivers 106 and/or one or more memories 104, etc. to receive the configuration, and one or more transceivers 106 may receive the configuration from the network side.

UE may receive RS (e.g., SSB/CSI-RS/TRS/PT (phase tracking)-RS) for channel state measurement through/using TRP 1 and/or TRP 2 from the network side (S110). For example, when receiving RS through/using multiple TRPs, information on a relationship (e.g., QCL) between RSs may be received. In addition, the UE may receive an indication for CSI reporting through/using TRP 1 and/or TRP 2 from the network side (S113). For example, in the case of aperiodic CSI reporting, the indication may be performed through CSI reporting triggering DCI. Alternatively, in the case of semi-persistent CSI reporting/periodic CSI reporting, step S113 may be omitted. In addition, steps S110 and S113 may be performed by changing the order or merging into one step.

For example, the operation in which the UE (100 or 200 in FIG. 20) receives the RS for channel state measurement and/or the indication for CSI reporting from the network side (200 or 100 in FIG. 20) in the above-described step S110 and/or S113 may be implemented by the apparatus of FIG. 20 to be described below. For example, referring to FIG. 20, one or more processors 102 may control one or more transceivers 106 and/or one or more memories 104, etc. to receive the RS for channel state measurement and/or the indication for CSI reporting, and one or more transceivers 106 may receive the RS for channel state measurement and/or the indication for CSI reporting from the network side.

The UE may perform CSI calculation (or measurement) based on the RS and information configured from the network side (e.g., reporting setting information, information indicated by DCI, etc.) (S115). For example, the UE may perform CSI calculation/measurement in consideration of multi-TRP transmission. In CSI calculation/measurement considering MTRP operation, CSI for one TRP may be measured/calculated in consideration of interference from other TRPs. For example, the UE may perform CSI calculation/measurement based on the above-described proposed methods (e.g., embodiments related to interference-based CQI calculation/reporting, etc.). For example, CSI for each TRP (e.g., TRP 1/TRP 2) may be measured based on a resource (e.g., CMR/IMR) for CSI measurement for each TRP. For example, assuming NZP IMR as CMR, and assuming CMR as IMR, inverse CQI/composite CQI may be calculated. When ZP IMR is configured, inverse CQI/composite CQI may be calculated assuming the ZP IMR as IMR.

For example, the operation in which the UE (100 or 200 in FIG. 20) performs CSI calculation/measurement in the above-described step 115 may be implemented by the apparatus of FIG. 20 to be described below. For example, referring to FIG. 20, one or more processors 102 may control one or more transceivers 106 and/or one or more memories 104, etc. to perform CSI calculation/measurement.

The UE may report CSI through/using TRP 1 and/or TRP 2 to the network side (S120). For example, the CSI reporting operation may be performed based on the content described in the above-described CSI report. For example, CSI (e.g., RI/PMI/CQI)/inverse CQI/composite CQI, etc. may be transmitted to the network side through PUCCH/PUSCH.

For example, the operation in which the UE (100 or 200 in FIG. 20) reports CSI to the network side (200 or 100 in FIG. 20) in the above-described step S120 may be implemented by the apparatus of FIG. 20 to be described below. For example, referring to FIG. 20, one or more processors 102 may control one or more transceivers 106 and/or one or more memories 104, etc. to report the CSI, and one or more transceivers 106 may transmit the CSI to the network side.

The UE may receive data scheduling information and/or data/RS (e.g., DM-RS for data decoding) based on data scheduling information through/using TRP 1 and/or TRP 2 from the network side (S125). In this case, a precoding to be applied to data scheduling and data may be determined/calculated by the base station based on CSI reported by the UE, but may not consider only the CSI reported by the UE. For example, scheduling through/using TRP 1 may be performed based on the first CSI (e.g., first RI/first PMI) for TRP 1 and the updated first CQI based on the second inverse CQI. For example, scheduling through/using TRP 2 may be performed based on the second CSI (e.g., second RI/second PMI) for TRP 2 and the updated second CQI based on the first inverse CQI.

For example, the operation in which the UE (100 or 200 in FIG. 20) receives the data scheduling information and/or data/RS based on the scheduling information from the network side (200 or 100 in FIG. 20) in the above-described step S125 may be implemented by the apparatus of FIG. 20 to be described below. For example, referring to FIG. 20, one or more processors 102 may control one or more transceivers 106 and/or one or more memories 104, etc. to receive the data scheduling information and/or data/RS based on the scheduling information, and one or more transceivers 106 may receive the data scheduling information and/or data/RS based on the scheduling information from the network side.

As described above, signaling and operation (e.g., embodiments related to interference-based CQI calculation/reporting, etc.) of network side/UE may be implemented by a device to be described below (e.g., device 100/200 of FIG. 20). For example, the network side (e.g., TRP 1/TRP 2) may correspond to the first wireless device, the UE may correspond to the second wireless device, and vice versa may be considered in some cases.

Figure 20:
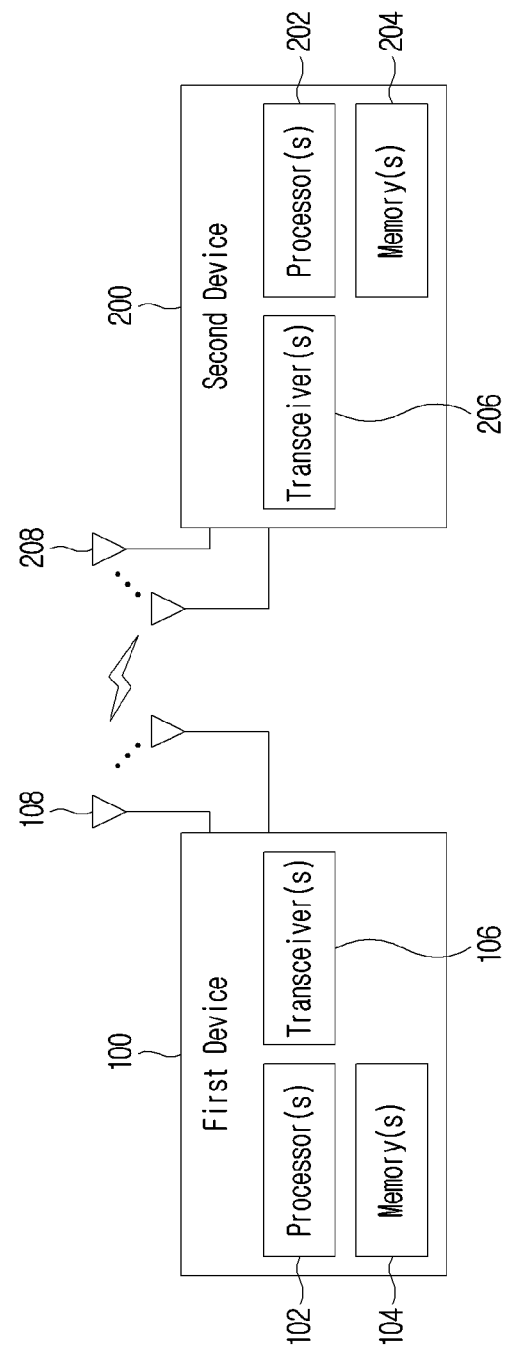
FIG. 20 illustrates a vehicle device according to an embodiment of the present disclosure.

For example, the above-described signaling and operation (e.g., embodiments related to interference-based CQI calculation/reporting, etc.) of network side/UE may be processed by one or more processors 102, 202 of FIG. 20, and the above-described signaling and operation (e.g., embodiments related to interference-based CQI calculation/reporting, etc.) of network side/UE may be stored in a memory (e.g., one or more memories 104 and 204 of FIG. 20) in forms of a command/program (e.g., instruction, executable code) for driving one or more processors (e.g., 102, 202) of FIG. 20.

General Device to Which the Present Disclosure May Be Applied

FIG. 20 is a diagram which illustrates a block diagram of a wireless communication system according to an embodiment of the present disclosure.

In reference to FIG. 20, a first device/wireless device 100 and a second device/wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of transmitting channel state information (CSI) by a terminal in a wireless communication system, the method comprising:
receiving, from a base station, CSI-related configuration information including a first CSI report configuration and a second CSI report configuration;
calculating a first interference-based channel quality indicator (CQI), based on assuming a first channel measurement resource (CMR) related to the first CSI report configuration as an interference measurement resource (IMR) and assuming a first IMR related to the first CSI report configuration as a CMR; and
transmitting, to the base station, first CSI including the first interference-based CQI.

2. The method according to claim 1, wherein:
the first CSI further includes a first CQI calculated by assuming the first CMR as a CMR and assuming the first IMR as an IMR.

3. The method according to claim 1, wherein:
the first interference-based CQI is calculated by assuming that a precoding based on a identity matrix is applied to a channel measured based on the first IMR.

4. The method according to claim 1, wherein:
the first interference-based CQI is calculated by assuming a precoding based on the first CSI is applied to a channel measured based on the first CMR.

5. The method according to claim 1, further comprising:
calculating a second interference-based CQI, based on assuming a second CMR related to the second CSI report configuration as an IMR and assuming a second IMR related to the second CSI report configuration as a CMR; and
transmitting, to the base station, second CSI including the second interference-based CQI.

6. The method according to claim 5, wherein:
the second CSI further includes a second CQI calculated by assuming the second CMR as a CMR and assuming the second IMR as an IMR.

7. The method according to claim 5, wherein:
the second interference-based CQI is calculated by assuming that a precoding based on a identity matrix is applied to a channel measured based on the second IMR.

8. The method according to claim 5, wherein:
the second interference-based CQI is calculated by assuming a precoding based on the second CSI is applied to a channel measured based on the second CMR.

9. The method according to claim 1, wherein:
the first CSI is calculated with reference to a slot n,
the second CSI is calculated with reference to a slot n+k (here, k is an integer equal to or greater than 1).

10. The method according to claim 1, wherein:
the CSI-related configuration information further includes information related to a report quantity,
the report quantity indicates at least one of CQI, precoding matrix indicator (PMI), rank indicator (RI), layer indicator (LI), CSI-reference signal resource indicator (CRI), layer 1-reference signal received power (L1-RSRP), synchronization signal block resource indicator (SSBRI), or interference-based CQI.

11. The method according to claim 1, wherein:
the first interference-based CQI includes at least one of inverse CQI, composite CQI, or a difference value from the first CQI.

12. The method according to claim 1, wherein:
the CSI is transmitted to the base station through at least one of a physical uplink control channel (PUCCH) or a physical uplink shared channel (PUSCH).

13. The method according to claim 1, wherein:
the first CSI report configuration is associated with a first transmission reception point (TRP),
the second CSI report configuration is associated with a second TRP.

14. The method according to claim 1, wherein:
the CMR includes a non-zero power (NZP) CSI-RS related to obtaining CSI, the IMR includes at least one of an NZP CSI-RS or a zero power (ZP) CSI-RS related to at least one of CSI-interference measurement (IM) or IM.

15. A terminal for transmitting channel state information (CSI) in a wireless communication system, the terminal comprising:
at least one of transceiver; and
at least one processor connected to the at least one transceiver, wherein the at least one processor is configured to:
receive, from a base station through the at least one transceiver, CSI-related configuration information including a first CSI report configuration and a second CSI report configuration;
calculate a first interference-based channel quality indicator (CQI), based on assuming a first channel measurement resource (CMR) related to the first CSI report configuration as an interference measurement resource (IMR) and assuming a first IMR related to the first CSI report configuration as a CMR; and
transmitting, to the base station through the at least one transceiver, first CSI including the first interference-based CQI.

16. A method of receiving channel state information (CSI) by a base station in a wireless communication system, the method comprising:
transmitting, to a terminal, CSI-related configuration information including a first CSI report configuration and a second CSI report configuration; and
receiving, from the terminal, first CSI including the first interference-based CQI, calculated based on assuming a first channel measurement resource (CMR) related to the first CSI report configuration as an interference measurement resource (IMR) and assuming a first IMR related to the first CSI report configuration as a CMR.

17. A base station for receiving channel state information (CSI) in a wireless communication system, the terminal comprising:
at least one of transceiver; and
at least one processor connected to the at least one transceiver,
wherein the at least one processor is configured to:
transmit, to a terminal through the at least one transceiver, CSI-related configuration information including a first CSI report configuration and a second CSI report configuration; and
receiving, from the terminal through the at least one transceiver, first CSI including the first interference-based CQI, calculated based on assuming a first channel measurement resource (CMR) related to the first CSI report configuration as an interference measurement resource (IMR) and assuming a first IMR related to the first CSI report configuration as a CMR.

* * * * *